United States Patent [19]

Fields

[11] Patent Number: 4,728,948
[45] Date of Patent: Mar. 1, 1988

[54] REMOTE MONITOR AND CONTROL SYSTEM

[76] Inventor: Gary C. Fields, 2347 Pelham Pl., Oakland, Calif. 94611

[21] Appl. No.: 798,383

[22] Filed: Nov. 15, 1985

[51] Int. Cl.[4] .................. G05B 23/02; H04M 3/22; H04M 11/00
[52] U.S. Cl. .................. 340/825.06; 340/825.1; 340/825.15; 379/34; 379/102
[58] Field of Search ........... 340/825.06, 825.1, 825.15, 340/825.17, 870.16; 379/106, 107, 102, 34, 10, 22, 26, 29

[56] References Cited

U.S. PATENT DOCUMENTS

| | | | |
|---|---|---|---|
| 4,002,837 | 1/1977 | Ebner et al. | 379/107 |
| 4,021,615 | 5/1977 | James et al. | 379/102 |
| 4,047,155 | 9/1977 | Miller | 340/825.06 |
| 4,117,278 | 9/1978 | Ehrlich et al. | 379/34 |
| 4,332,980 | 6/1982 | Reynolds et al. | 379/102 |
| 4,348,668 | 9/1982 | Gurr et al. | 340/825.06 |
| 4,520,234 | 5/1985 | Fields et al. | 379/29 |
| 4,556,882 | 12/1985 | Brifman et al. | 340/825.06 |
| 4,675,896 | 6/1987 | Young | 379/34 |

*Primary Examiner*—Ulysses Weldon
*Assistant Examiner*—Ralph E. Smith
*Attorney, Agent, or Firm*—David B. Harrison

[57] ABSTRACT

A computer controlled wire center unit for a remote monitoring and control system is disclosed. The system includes an operations console at a central control point, a wire center unit remote from the operations console, and a plurality of switching units in the area to be remotely monitored and controlled from the central control point. Each switching unit is connected to the wire center by a wire pair, and a communications path extends between the wire center and the central control point. The modular wire center unit comprises a plurality of interconnected modules including a line select module, a line switch decoder module, a communications module, and a programmable digital microcomputer for controlling operations of the wire center unit modules in accordance with a series of prestored instructions including: periodic scanning of all switching units, signalling the operations console of any detected change in status of any switching unit, testing of tip and ring order of connection of each wire pair to each switching unit and reversing the order of connection of a wire pair in the event that improper order of connection is detected, and other automatic functions.

8 Claims, 9 Drawing Figures

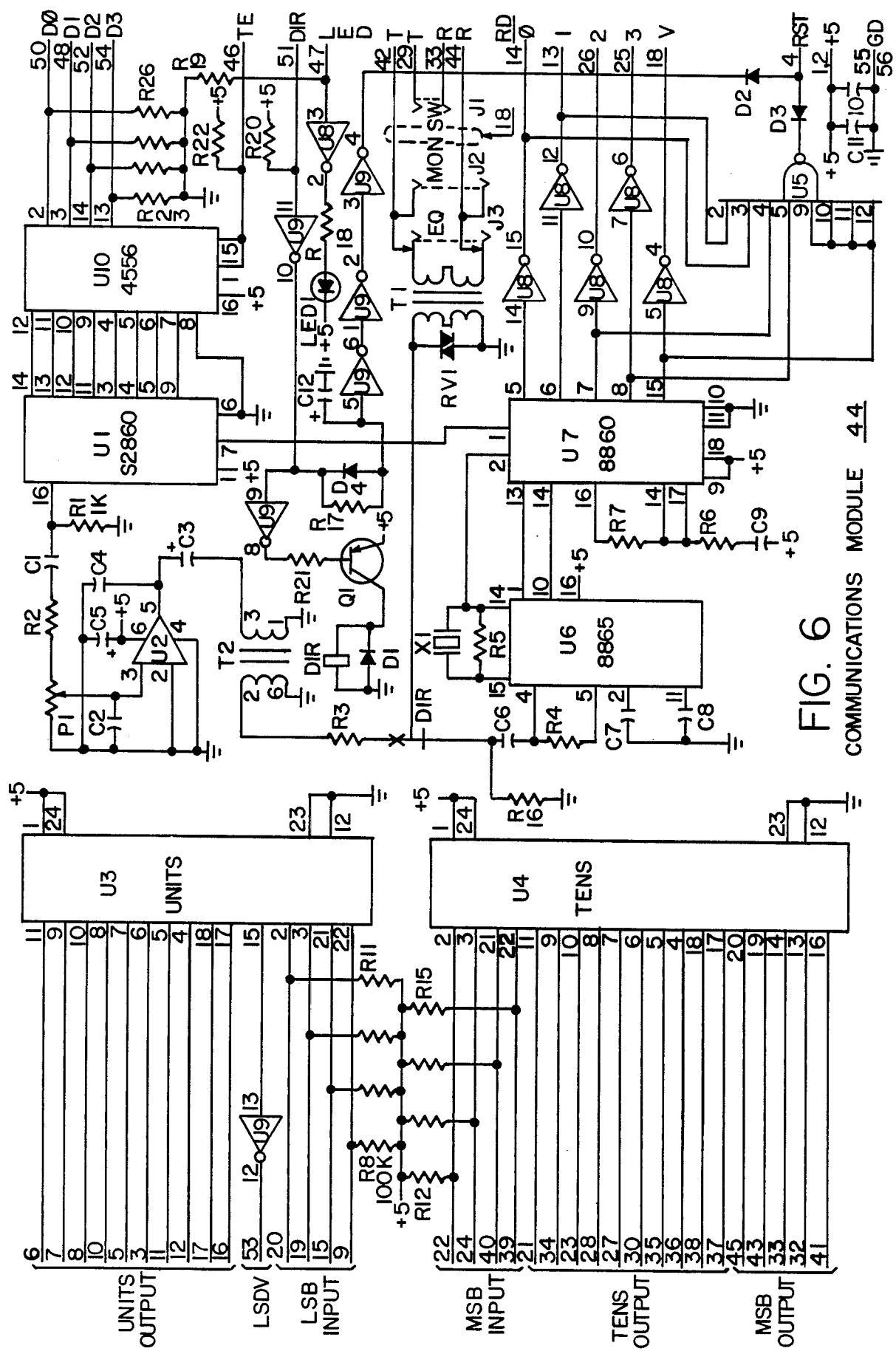
FIG. 6 COMMUNICATIONS MODULE 44

REMOTE MONITOR AND CONTROL SYSTEM

FIELD OF THE INVENTION

The present invention relates to remotely controlled switching systems. More particularly, the present invention relates to improvements in monitoring and control systems for remotely located devices, such as power switches.

BACKGROUND OF THE INVENTION

The need to monitor and control remote apparatus from a central control point is well known. One such need arises in the art of electric power distribution. Power from one or more generator locations is distributed by a network of distribution lines which extend to substations. Further distribution lines extend from each substation in order to reach all of the electric power customers in the service area and distribute power to them. Switching devices are interposed throughout the distribution system and service area to enable the system to be controlled by removal of one or more selected circuits from service in the event of fault or overload. Detection of the fault or overload at the central control point and commands sent therefrom via a communications path (typically provided by the telephone system) to cause actuation of a remotely actuable switch enable the control point operator to remove the fault area from the distribution network forthwith, thereby preventing further breakdown of the network on account of the fault condition.

One known approach for providing central monitoring and control of remote switching devices is set forth in U.S. Pat. No. 4,045,714 for "Remote Switch Control and Status Indicator System". The invention described in that patent provided a workable way to monitor circuit faults and operate remote power switches from a central location. A further improvement in that system is described in U.S. Pat. No. 4,128,856 entitled "Automatic Resetting Control Circuit for Air Switch Operator". Some pertinent background information may also be found in U.S. Pat. No. 4,520,234 for "Remote Cable Switching System".

The prior system used telephone audio tone signalling between the central control point and each wire center location. A metallic wire pair, usually provided by the telephone company, extended between each remotely controllable switch and its associated wire center. Constant current in a first flow direction and at a nominal voltage of 48 volts was applied over the wire pair, and the resultant voltage drop across the loop established the actual conditions at the remote site. Various resistance elements were selectably interposed in the loop in accordance with monitored conditions at the remote site and thereby affected the voltage drop across the loop. For example, if a fault condition was present, such as overcurrent, an overcurrent detector would trip, shunting across a resistance in the control loop. Another resistance or shunt was present, depending upon whether the remote switch was open or closed. The voltage drop was measured at the wire center and then converted into an analog signal which was sent to the operator at the central control point. The following table sets forth examples of the conditions at the remote site which were being monitored:

| Voltage | Condition | Code |
| --- | --- | --- |
| 0–5 | Short circuit in wire pair. | 0 |
| 8.25–13.25 | Switch closed, fault condition present. | 2 |
| 18.00–23.00 | Switch closed, no fault. | 4 |
| 28.75–33.75 | Switch open, fault condition present. | 6 |
| 38.50–43.50 | Switch open, no fault. | 8 |
| 45–50 | Wire pair open. | 5 |

With the prior system the operator at the central control location could dial up a wire center via telephone and obtain the current status of any one or all of the remote switch sites to which the wire center was connected. In addition, the operator could signal remote actuation of the switch if it were provided with an automatic actuator.

In order for remote actuation of the switch to occur, the current loop for monitoring conditions was removed from the line, and a power supply of higher voltage, typically 100 volts or more (coin collect or return) was applied across the wire pair in reverse sense or polarity. This higher voltage of reverse polarity passed through a control circuit to charge an actuation capacitor of high storage capacity. Once the charging voltage was removed from the wire pair, the energy stored in the capacitor was applied to operate an actuation solenoid, and the switch was thereupon automatically moved from its closed position to its open position. This new condition, code 8, was then presented across the control loop, and the operator at the central facility could readily determine this new condition.

While the solutions proposed by the referenced prior patents worked well, they were manual insofar as monitoring activity via the wire center units was concerned, and their use resulted in a number of flaws and drawbacks. Since those systems relied upon the telephone network for the communications path, certain evolutionary changes in the telephone system have negatively impacted those prior solutions. For one thing, the original remote control circuits were designed to operate when voltage in excess of approximately 56 volts appeared across the tip and ring wires of the communications pair. As electronic telephone switching systems have become prevalent, the telephone central office battery voltage has gone up in value. When applied to a wire pair connected in reverse sense, this higher nominal line voltage has actually caused the remote switch to be operated, instead of being monitored, thereby inadvertently disconnecting service area customers from the electric power distribution network and resulting in customer complaints.

This problem of reversed wire pairs has led directly to another problem. Prior telephone maintenance practice and procedure has been to apply an ohmmeter across the tip and ring wires in order to sense in which direction (actuation polarity) the capacitor is seen to be charging, by deflection of the ohmmeter needle. The problem has been that telephone company ohmmeters have applied approximately 60 volts across the capacitor. The capacitor having charged to 56 volts now discharges and the switch is inadvertently opened, cutting off customers from electric power.

Another drawback lay in the fact that unless the central control operator had reason to monitor a particular switching unit, no regular monitoring access was made to each remotely located switching unit. During times of inclement or harsh weather conditions, deterioration of failure of the wire pair might go undetected until it was desired to operate the remote switch controlled by the switching unit. By then, it was too late, and a lineman had to be dispatched to operate the switch manually.

SUMMARY OF THE INVENTION WITH OBJECTS

A general object of the present invention is to provide improvements in monitoring and control systems for remotely located devices such as power switches in a manner which overcomes limitations and drawbacks of the prior art.

A specific object is to provide an improved wire center unit by modularizing it to facilitate manufacturing, installation and maintenance and by providing it with a microcomputer supervisor to facilitate improved, more versatile operations.

Another object of the present invention is to program a microcomputer supervisor for a wire center unit so that it periodically scans all switching units attached to the unit to be sure that monitored conditions have not changed between scans, and automatically to signal to the central control point any detected change in condition.

A further object of the present invention is to program a microcomputer supervisor for a wire center unit so that it automatically senses the order of connection of a wire pair extending to a switching unit and automatically corrects the order in the event that a reversal is detected.

One more object of the present invention is to provide a switching unit with a positive threshold circuit which minimizes the liklihood that reversal of the order of connection of the wire pair extending to the switching unit will inadvertently cause a remote switch to be operated instead of being monitored.

One further object of the present invention is to provide an improved detection circuit for detecting the presence of switch operation induced transisents on a wire pair generated by operation of a remote switch in response to a remote switching command, thereby providing an independent confirmation of intended remote switching activity.

The present invention is within a remote monitoring and control system of the type typically including an operations console at a central control point, a wire center unit located remote from the operations console at a location at which wire pairs for a geographic area are concentrated, and a plurality of switching units in the area to be remotely monitored and controlled from the central control point. Each switching unit is connected to the wire center by a wire pair, and a communications path extends between the wire center and the central control point.

An improved wire center unit comprises a plurality of interconnected plug-in modules including:

at least one line select module for selecting a switching unit wire pair from among a plurality of pairs connected to the line select module, a line switch decoder module for sensing conditions present at a selected switching unit and for converting sensed conditions into a binary code, and for providing a control signal for operating the selected switching unit, a communications module connected to the communications path for decoding commands received from the operations console and for encoding responses from the wire center unit sent to the operations console, and a programmable digital microcomputer for controlling all operations of the wire center unit in accordance with a series of instructions stored in a read only program memory associated with the digital microcomputer means.

In one aspect of the present invention, the digital microcomputer is programmed so that the wire center unit automatically scans periodically all switching units attached thereto in order to determine present status thereof and automatically signals the operations console when any change in status of any switching unit is detected.

In another aspect of the present invention, the digital microcomputer is programmed automatically to test the tip and ring order of connection of each wire pair extending to each switching unit from the wire center unit before passing on any operational commands received from the operations console. In this aspect of the invention the wire center unit includes sense reversal circuitry for sensing and reversing the order of connection of a wire pair in the event that improper order of connection of a wire pair is detected.

In a further aspect of the present invention, the sense reversal circuitry automatically detects a response from the switching unit characteristic of pair reversal and thereupon automatically reverses the order of connection.

In one more aspect of the present invention the line switch decoder module includes a switch operation detection circuit responsive to switching transients induced on a selected wire pair in response to remote switching activity. The circuit generates a binary value readable by said microcomputer means indicative of detection of a switching transient on the selected wire pair. The improved detection circuit results from a special algorithm in the microcomputer program to distinguish the desired switch transient from other transients that may be produced from line noises.

In a distinct aspect of the present invention, an improved switching unit is provided for use within a remote monitoring and control system of the type including a wire center unit at a location at which wire pairs for a geographic area are concentrated, and a plurality of switching units in the area to be remotely monitored and controlled from a central control point through the wire unit. In this aspect of the invention each switching unit is connected to the wire center by a wire pair and includes a monitoring circuit which indicates conditions at the switching unit in response to current flow in a forward direction and further includes a control circuit which responds to current flow in an opposite direction by operating e.g. a switch. In this aspect the improved switching unit includes a threshold circuit in series with the control circuit which passes current flow in opposite direction only when the potential difference across the threshold circuit exceeds a predetermined voltage substantially in excess of the potential difference which develops across the threshold circuit from current flow in the forward direction.

These and other objects, advantages and features of the present invention will be better understood and appreciated by consideration of the following detailed description of a preferred embodiment present in conjunction with the accompanying drawing.

BRIEF DESCRIPTION OF THE DRAWINGS

In the Drawings:

FIG. 6 is a circuit diagram of a communications module (COM) of the wire center unit depicted in FIG. 3.

FIG. 8 should be read in conjunction with FIGS. 3 through 7 in order to obtain an understanding of the interconnection of the modules and the connection of the wire center unit to one hundred switching units and to the operator console at the central operations center. Backplane connectors LC 1 through LC 8 are identically connected, and they have been combined into a single connector in order to save drawing room.

DETAILED DESCRIPTION OF A PREFERRED EMBODIMENT

Figure 1:
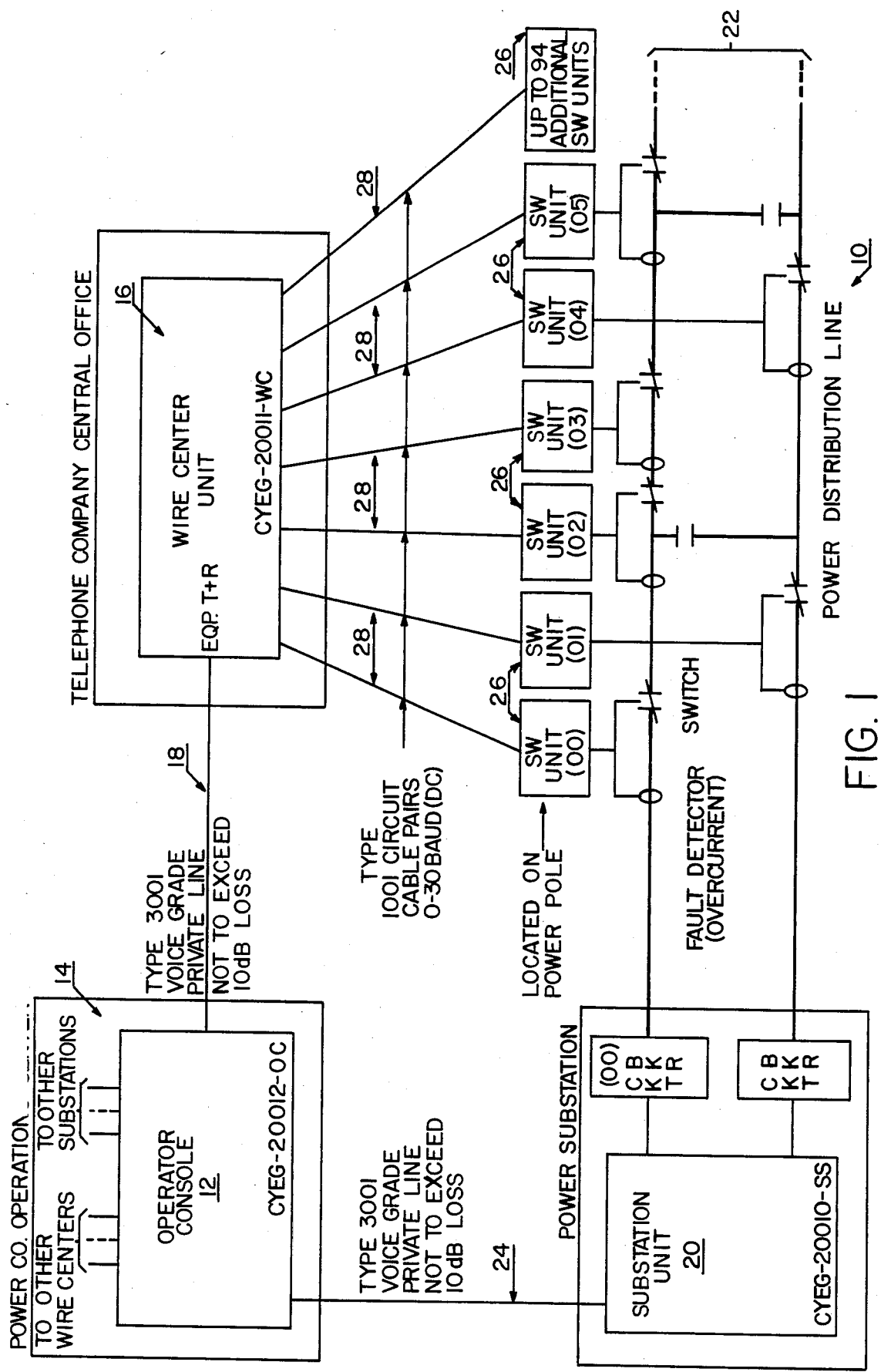
FIG. 1 is an overall system block diagram for a remote monitoring and control system incorporating the improvements of the present invention.

A remote monitor and control system 10 incorporating principles of the present invention is depicted in overview in FIG. 1. Therein, the system 10 includes an operator console 12 located at a power company operations center 14 at which the generation and distribution of electrical power is controlled.

A wire center unit 16 is located in a telephone company central office (wire concentration center) location geographically removed from the operations center 14 and connected to the operations center 14 by a voice grade dedicated private line 18. All communications between the operator console 12 and the wire center unit 16 pass over the private line 18, typically in the form of dual tone modulated frequency (touch tone tm) code sequences.

A substation unit 20, similar to the wire center unit 16, may be located at a remotely controlled substation located in the path of a power distribution network 22. The substation unit 20 is connected to the operations center 14 by a second voice grade dedicated line 24. While only one wire center 16 and one substation 20 are illustrated in FIG. 1, it is to be understood that all of the many wire centers and substations of the power distribution network controlled from the center 14 would be connected to the operations center for monitoring and control at the operator console 12.

Up to one hundred switching units 26 located in the geographical area serviced by the particular central office are serviced by the wire center 16 located in that central office. Two conductor (tip and ring wires) metallic pairs 28 extend from the central office wire center 16 to each switching unit 26, and the nominal line resistance of each pair 28 ranges from zero to approximately 2000 ohms.

Switching Unit 26

Figure 2:
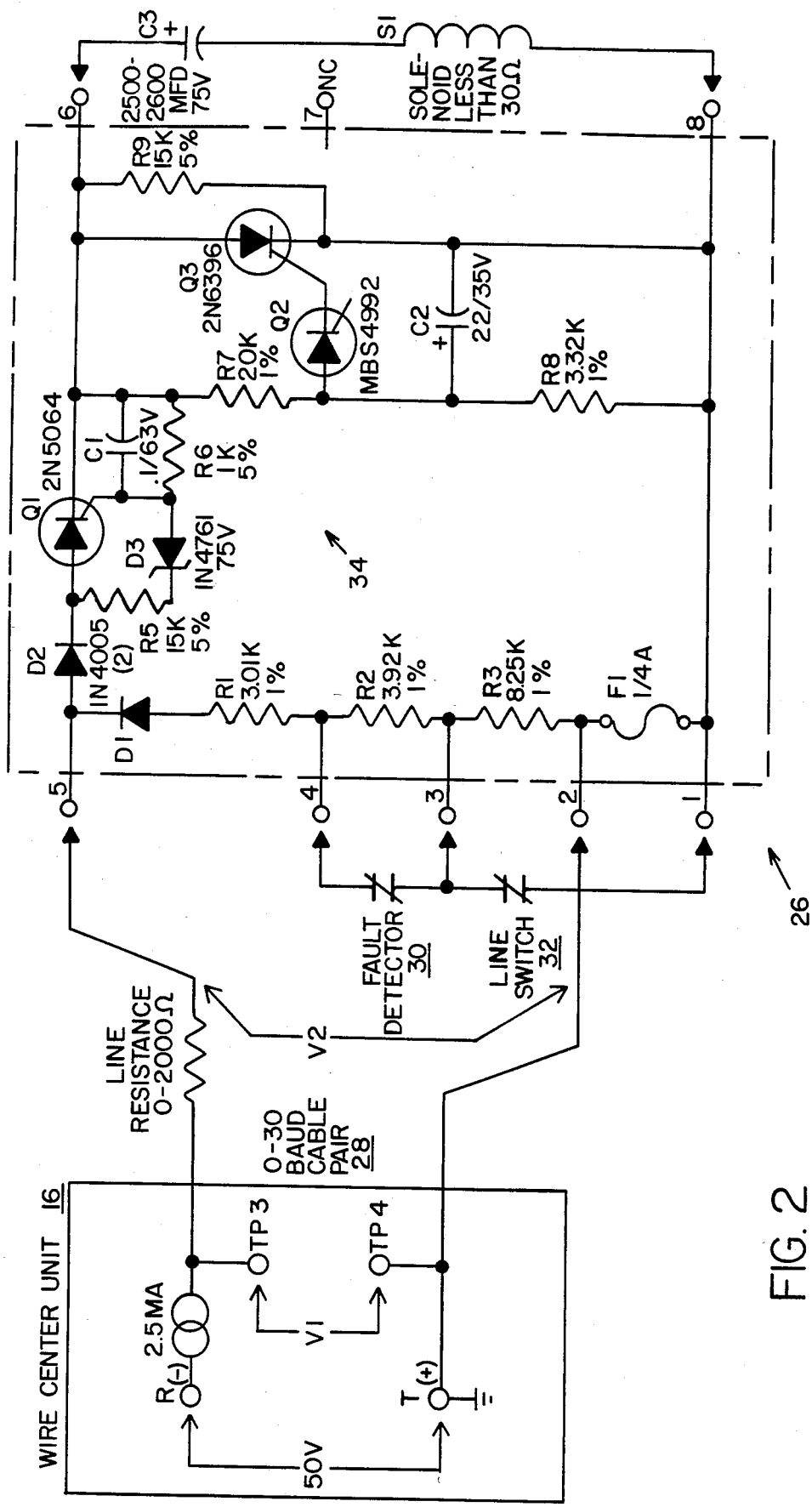
FIG. 2 is a schematic circuit diagram of a switching unit of the system depicted in FIG. 1 which incorporates improvements in accordance with the present invention.

Each switching unit 26 performs two functions. It monitors conditions at its location, typically a remotely actuable power switch on a line pole or in an underground cable vault, and it controls actuation of the power switch. The basic architecture of the switching unit 26 is shown in FIG. 2, and is described in detail in the reference U.S. Pat. Nos. 4,045,714 and 4,128,856. In normal operation, a nominal −48 volt, 2.5 milliampere constant current is sent through the ring wire of the pair 28 to the selected switching unit 26. The diode D1 of the switching unit conducts, and current flows through the series resistors R1, R2 and R3 and then returns to the wire center 16 via the tip wire which is at ground. In the event that a fault such as overcurrent tripped a fault detector 30, a contact pair of the detector 30 shorts out the resistor R2, increasing the current flow. Moreover, if a line switch 32 associated with the switching unit 26 is open, a sense switch senses this fact and shorts out the resistor R3. The resistors R2 and R3 differ substantially in value. A voltage V1 measured across the tip and ring wires of the pair 28 at the wire center unit 16 provides the status at the switching unit, as already explained in connection with the condition table set forth in the Background of the Invention section of this patent, above.

To actuate the line switch, current is reversed on the tip and ring wires, and current passes through the diode D2 and begins to charge a large storage capacitor C3. Charging typically takes from two to five seconds. After the capacitor has charged to 56 volts the SCR Q3 fires, discharging the capacitor into the solenoid S1. The increasing charging voltage is sensed across the series resistor network R7 and R8, and the common node thereof passes through a trigger diode Q2 to trigger the SCR Q3 which enables all of the charge stored in the capacitor C3 to be passed through the winding of the solenoid S1, thereby causing it to operate.

As previously mentioned, if the tip and ring wires of a switching unit were inadvertently reversed, attempts to monitor conditions at the switching unit led to unwanted charging of the capacitor C3 and inadvertent operation of the solenoid S1. In accordance with one aspect of the present invention, a protection threshold circuit 34 is included in series with the D2 diode, the storage capacitor C3 and the solenoid S1. The circuit 34 includes an SCR Q1 and a series control network including a resistor R5, a 75 volt zener diode D3, and a resistor R6. This network causes the series SCR Q1 to fire only when a 75 volt potential is applied across the tip and ring wires of the pair 28 leading to the switching unit 26. Thus, the threshold circuit 34 prevents unwanted charging of the capacitor C3 in the event of reversal of the tip and ring wires of the wire pair 28.

Wire Center Unit 16

Figure 3:
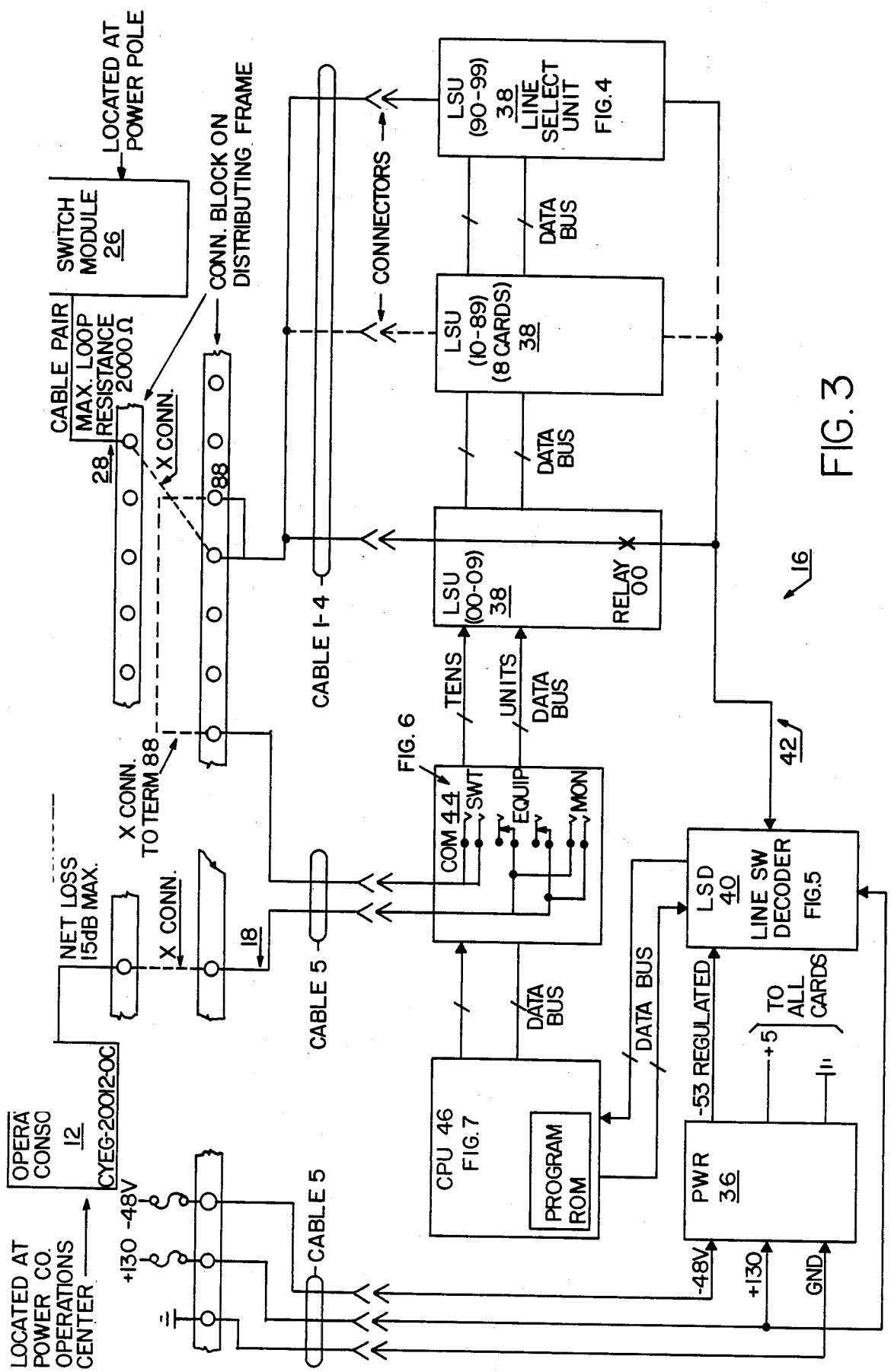
FIG. 3 is a block and circuit diagram of a modular wire center unit of the system depicted in FIG. 1 which incorporates improvements in accordance with the present invention.
Figure 8:
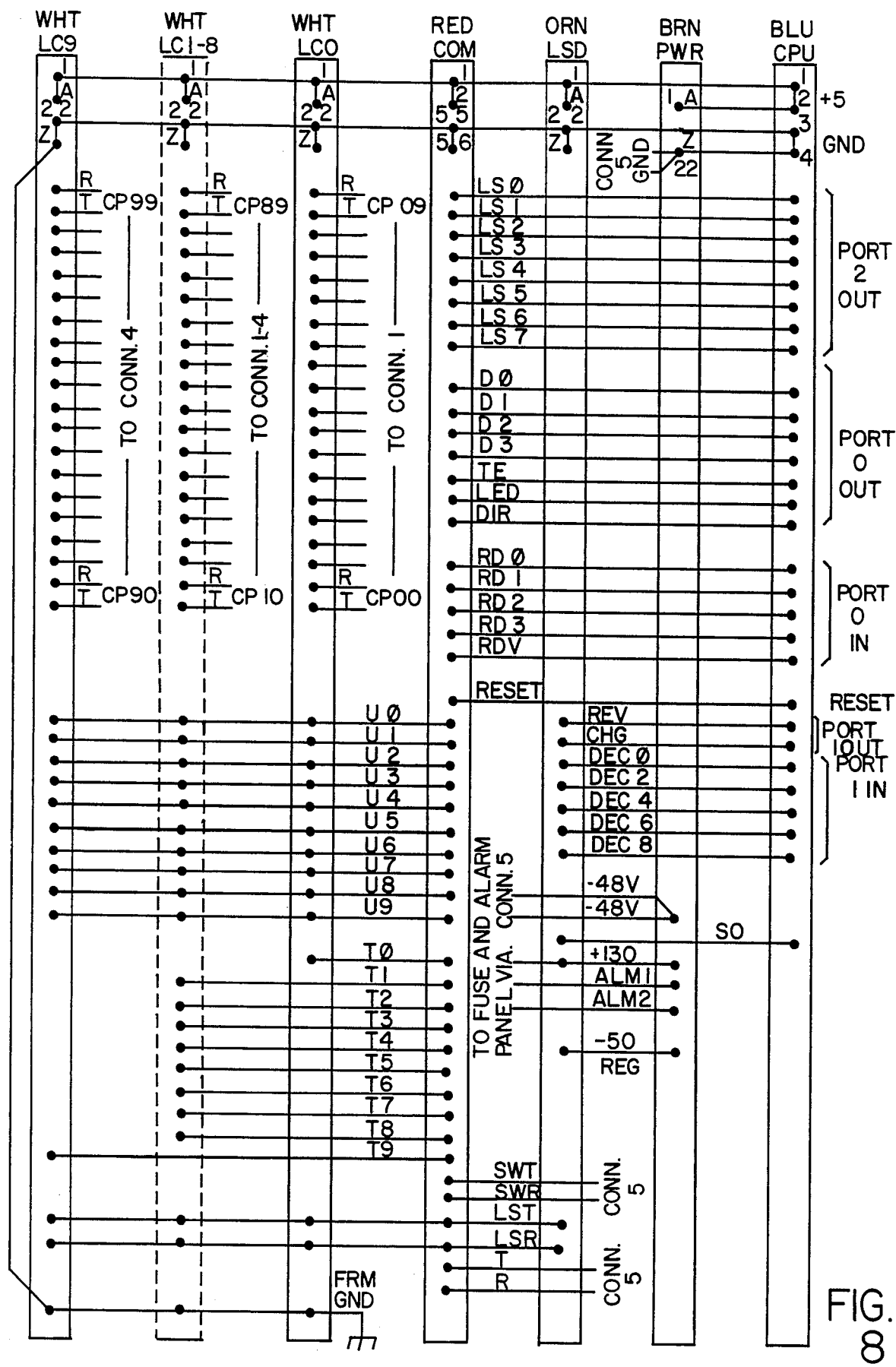
FIG. 8 is a backplane wiring diagram of the wire center unit depicted in FIG. 3 showing the interconnection of the various modules making up the wire center unit.

The wire center unit 16 is depicted in overview in FIG. 3. In accordance with an aspect of the present invention, the wire center unit 16 is modular, with each module plugging into a cabinet having a backplane. Backplane interconnection of the modules about to be described is shown in FIG. 8, and reference to FIG. 8 should be made in tracing out the circuits comprising the wire center unit. It will be appreciated by those skilled in the art that FIGS. 4 and 5 employ a type of notation for switch contacts referred to as "detached contact" notation in which an "X" shown intersecting a conductor represents a normally open "make" contact of a relay, and a "bar" shown intersecting a conductor at right angles represents a normally closed "break" contact of a relay.

There are five types of modules which plug into the cabinet forming the wire center unit 16. A power supply module 36 converts −48 volts and +130 volts supplied from the central office battery into supply voltages of −53 volts, +5 volts and +100 volts which are distributed to the other modules via power buses on the backplane.

Up to ten line select modules (LSU) 38 are provided. Each LSU module 38 is capable of selecting one of ten wire pairs 28 extending to ten service units 26. One of these modules is depicted electrically in FIG. 4.

Figure 5:
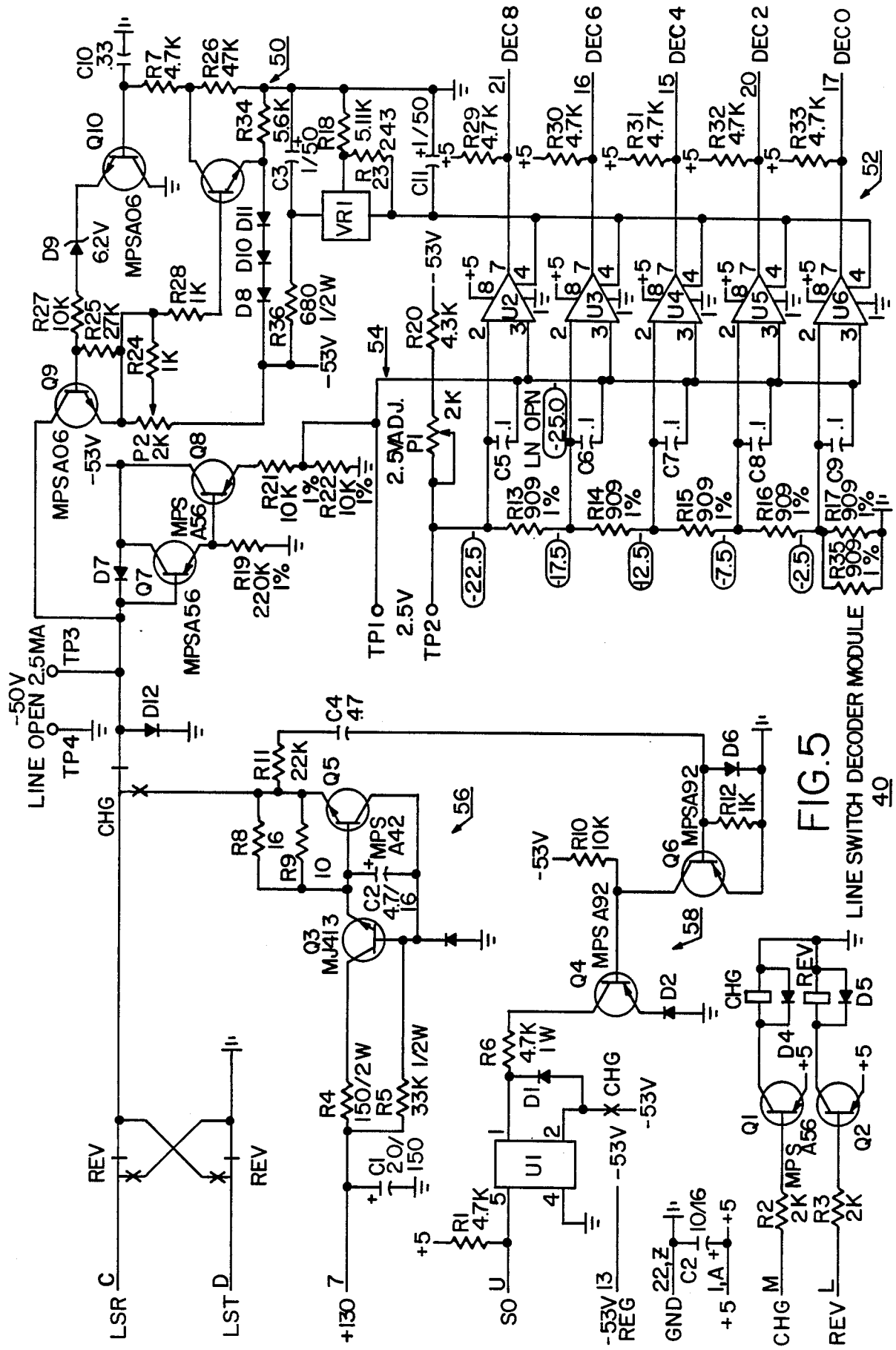
FIG. 5 is a circuit diagram of a line switch decoder module (LSD) of the wire center unit depicted in FIG. 3.

A line switch decoder module (LSD) 40 is connected to the line select modules 38 by a common line 42, also referred to as LSR and LST. The line switch decoder module 40 actually measures the voltage V1 across a loop to a selected service unit 26, and also supplies charging current to the capacitor C3 to a selected unit 26 to operate its solenoid S1 and associated power switch 32. The circuitry of the line switch decoder module 40 is depicted in FIG. 5.

A communications module (COM) 44 provides DTMF encode and decode operations and thereby interfaces the wire center unit 16 and the operator console 12, via the dedicated private line 18. The circuitry of the communications module 44 is depicted in FIG. 6.

A microcomputer supervisor module (CPU) 46 provides all of the necessary control signals to the other modules of the unit 16, in accordance with a control program stored in a program read only memory (ROM). The circuitry of the microcomputer module 46 is depicted in FIG. 7, and a listing of a control program is set forth at the end of this specification.

Line Select Module 38

Figure 4:
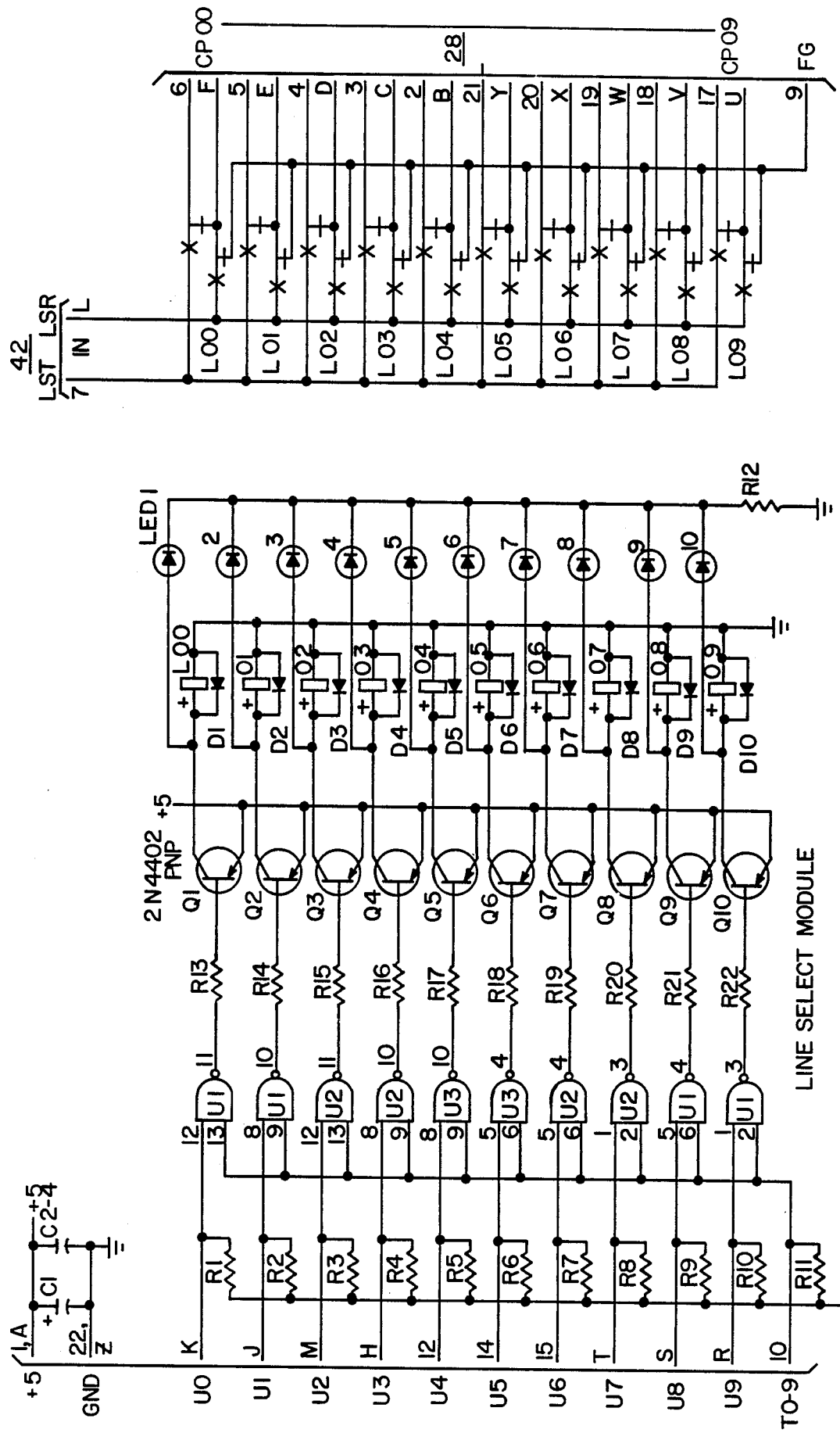
FIG. 4 is a circuit diagram of a line select module (LCn) of the wire center unit depicted in FIG. 3.

Each line select module 38, of which the wire center unit 16 may include up to ten, includes a series of two-input NAND gates U1 through U3 as shown in FIG. 4. One input of each gate is connected in parallel to a backplane line TO-9 to provide a select control for this particular module (the tenth module of the unit 16). Each of the other inputs is connected to an individual line U0 through U9 of the backplane (FIG. 8). The lines U0 through U9 and TO-9 extend to the communications module 44 which is responsible for actually selecting a particular module 38, and also for actually selecting one of the wire pairs 28 serviced by the module 38. Each NAND gate operates a driver transistor Q1 through Q9, and each transistor in turn causes current to pass through the winding of a line select relay L00 through L09. Operation of a particular line select relay causes the contacts of that relay to switch with the effect that a shunt is removed from the selected wire pair 28 and it is connected onto the common bus 42 leading to the line switch decoder 40 (FIG. 5). A shunt to earth ground is applied across each wire pair 28, except when selected, so that the effects of any transient currents which may be induced in the pair 28 will thereby be minimized, and unwanted operation of a switching unit 26 thereby avoided.

Line Switch Decoder Module 40

The line switch decoder module is connected to the common LSR, LST bus 42. A reversing relay REV is provided on the module 40 in order to reverse the sense of the tip and ring wires of a particular wire pair 28. This reversing relay REV operates under the control of the microcomputer 46 in response to a signal put out on backplane line L from port 1 output, bit position 8. As will be explained in conjunction with the discussion of the microcomputer 46 hereinafter, the sense of each selected pair 28 is first tested, and if a reversal is detected, the microcomputer operates the reversing relay REV and thereby reverses the tip and ring wire orientation of the particular wire pair 28 which has been selected and connected to the common bus 42.

A constant current providing circuit 50 applies a constant current of approximately 2.5 milliamperes to the selected wire pair 28 extending to the selected switching unit 16. This circuit comprises the transistors Q9, Q10 and Q11 and related circuitry shown on FIG. 5. A variable resistor P2 is provided to enable a nominal 2.5 milliamperes to be put out by the circuit 50. The power source for the constant current circuit 50 is −53 volts supplied by the power supply module 36.

As already explained, the selected switching module will return a particular voltage to the line switch decoder module, in accordance with the conditions actually present at the switching unit. The particular voltage is detected and is converted into a binary code by an analog to digital converter circuit 52 as shown on FIG. 5. This circuit comprises a voltage regulator VR1 which puts out a −27.5 voltage in combination with +5 volts to power a series of voltage comparators U2, U3, U4, U5 and U6, also as shown in FIG. 5. The actual voltage returned to the module 40 on the selected wire pair 28 is sensed by transistors Q7 and Q8 and put out on a line 54 which connects to one input of each of the comparators U2 through U6. A series of reference voltages are derived from the −53 volt supply line by a resistor series comprising the resistors R20, P1, R13, R14, R15, R16 and the R17 and R35 combination. Nodes providing −22.5 volts, −17.5 volts, −12.5 volts, −7.5 volts and −2.5 volts are provided to the other input of the comparators U2, U3, U4, U5 and U6, respectively.

If the selected pair 28 is open (substantially infinite impedance), the voltage appearing on the line 54 will be e.g. 25 volts, and this condition will cause a binary word of 11111 to be put out by the comparators U2-U6 on lines 21, 16, 15, 20 and 17 of the backplane. Other voltage combinations in accordance with the condition table set forth in the background of the invention will result in unique binary codes to be present on these lines. The particular binary code is sent to the microcomputer 46 where it is processed in accordance with the control program.

The line switch decoder module 40 also provides a reverse polarity charging current via a circuit 56. This circuit 56, including transistors Q3 and Q5 and related circuit elements as depicted in FIG. 5, applies a +130 volts to the selected wire pair 28 via the bus 42 when a charging relay CHG is operated. The microcomputer 46 commands operation of the charging relay by putting out a control signal from port 1 out, bit position 7 via the backplane line M between the CPU module 46 and the LSD module 40. At the line switch decoder module 40, the charging command is received by a transistor Q1 and thence applied through the winding of the charging relay CHG.

A switch operation detector circuit 58 is provided to sense the remote operation of the selected switch. When the switch operates, there is a sudden increase in line current which causes a short duration pulse to appear across the tip and ring wires of the selected pair 28. This pulse is passed through the network of R11 and C4 and is applied to the base of a transistor Q6 of the detector circuit. The pulse is amplified and shaped by transistors Q6 and Q4, and is applied to opto isolator U1. The isolator U1 shapes the pulse to be read by the microcomputer. A binary low signal is present at an "SO" output of the isolator U1, and this signal is sent via line U of the backplane to the microcomputer 46 which may read it as bit 6 of port 1 input to confirm that switching has occurred, independently of the condition sensing circuitry 52.

Communications Module 44

As shown in FIG. 6, the communications module 44 includes two separate circuits, a binary to decimal converter circuit including decoders U3 and U4, and a touch tone decoder/encoder circuit comprising the balance of circuit elements appearing in FIG. 6.

Binary codes put out by the microcomputer 46 are used to address the binary to decimal converter circuit. The LSB input to U3 and the MSB input to U4 come directly from port 2 output from the microcomputer 46. The LSB and MSB outputs of the decoders U3 and U4 are applied to select a particular line select unit 38 and a line within that unit.

Other binary codes put out by the microcomputer 46 may be converted by the communications module 44 into DTMF code tones to be returned via the dedicated private line 18 to the operator console 12. These codes are put out by the microcomputer 46 at its port 0 output, bits 1, 2, 3 and 4 and enter a decoder U10 as D0, D1, D2 and D3 via backplane lines 50, 48, 52 and 54. The decoded binary codes are converted into one of sixteen available DTMF tone combinations by operation of the U1 tone encoder. The resultant DTMF tone is level set by adjustment of the P1 resistor, amplified by a driven amplifier U2, passed through a DC isolation capacitor C3 and an impedance matching transformer T2. The tone may then be passed through normally open contacts of a direction relay DIR and the windings of a talk circuit transformer T1 and thence via the private line 18 to the operator console. The direction relay DIR is operated by the microcomputer 46 via a signal DIR put out from port 0 output, bit position 7, and line 51 of the backplane leading to the communications module 44. The DIR signal is amplified by U9 and applied to Q1.

When the direction relay is not operated, the communications module 44 is conditioned to received DTMF tone commands sent from the operator console. These tones enter the talk circuit transformer T1 via the private line 18. From the transformer T1, the tones enter a touch tone decoder provided by the integrated circuits U6 and U7. These circuits operate to decode the touch tones and put them out as binary values on lines RD0, RD1, RD2, RD3 and RDV which are directly read by the microcomputer at its port 0 input.

A hardware reset command (DTMF "#" symbol) may be sent from the operator console by a DTMF tone combination sensed by a NAND gate U5 as shown in FIG. 6. When the particular combination required by the FIG. 6 connections is present, a reset condition is generated by U5 and applied to the microcomputer at its reset input.

Another automatic reset command loop is provided from the DIR signal amplifier U9 as shown in FIG. 6. During normal program operation the DIR signal is at a logic low for only about 50 milliseconds at a time when a tone is applied to the line. In the rare event that the CPU 46 should fail to execute its program, the DIR signal will be at a logic low in excess of 50 milliseconds. This situation is detected by the U9 amplifier chain, and U9, pins 5–6, pins 12- and pins 3–4 generate a reset pulse which passes through a blocking diode D2. This reset pulse also causes the microcomputer 46 to restart execution of its program.

A light emitting diode LED 1 on the communications module 44 is operated by the microcomputer 46 under program control. With the control program in an idle loop, an alternating high and low logic level on an LED signal line causes the LED 1 to blink to inform an observer at the wire center unit that the unit 16 is properly functioning under program control.

Microcomputer 46

Figure 7A:
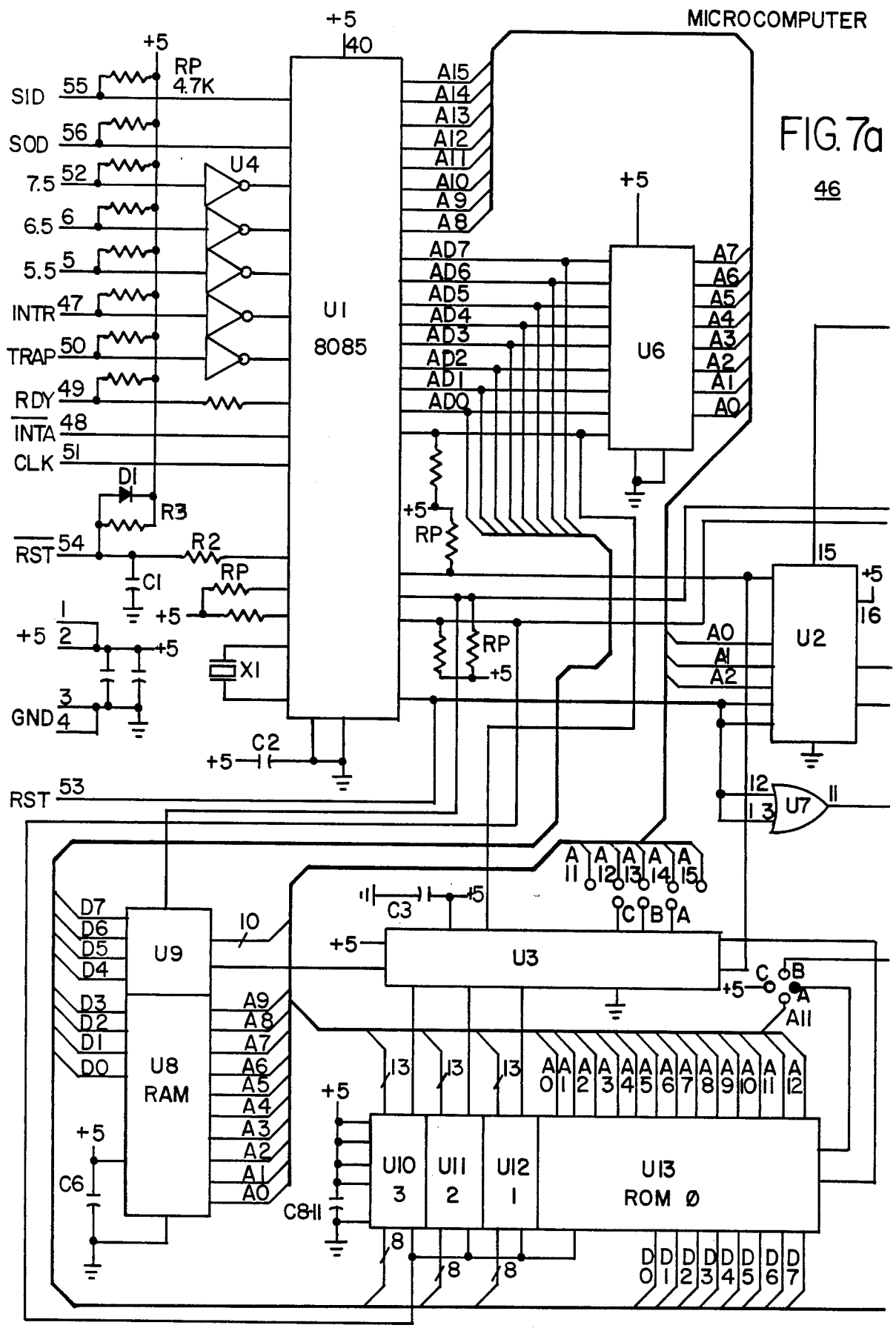
FIGS. 7a and 7b together provide a circuit diagram of a microcomputer supervisor module (CPU) of the wire center unit depicted in FIG. 3, FIG. 7a providing the left half of the diagram and FIG. 7b providing the right half of the diagram.
Figure 7B:
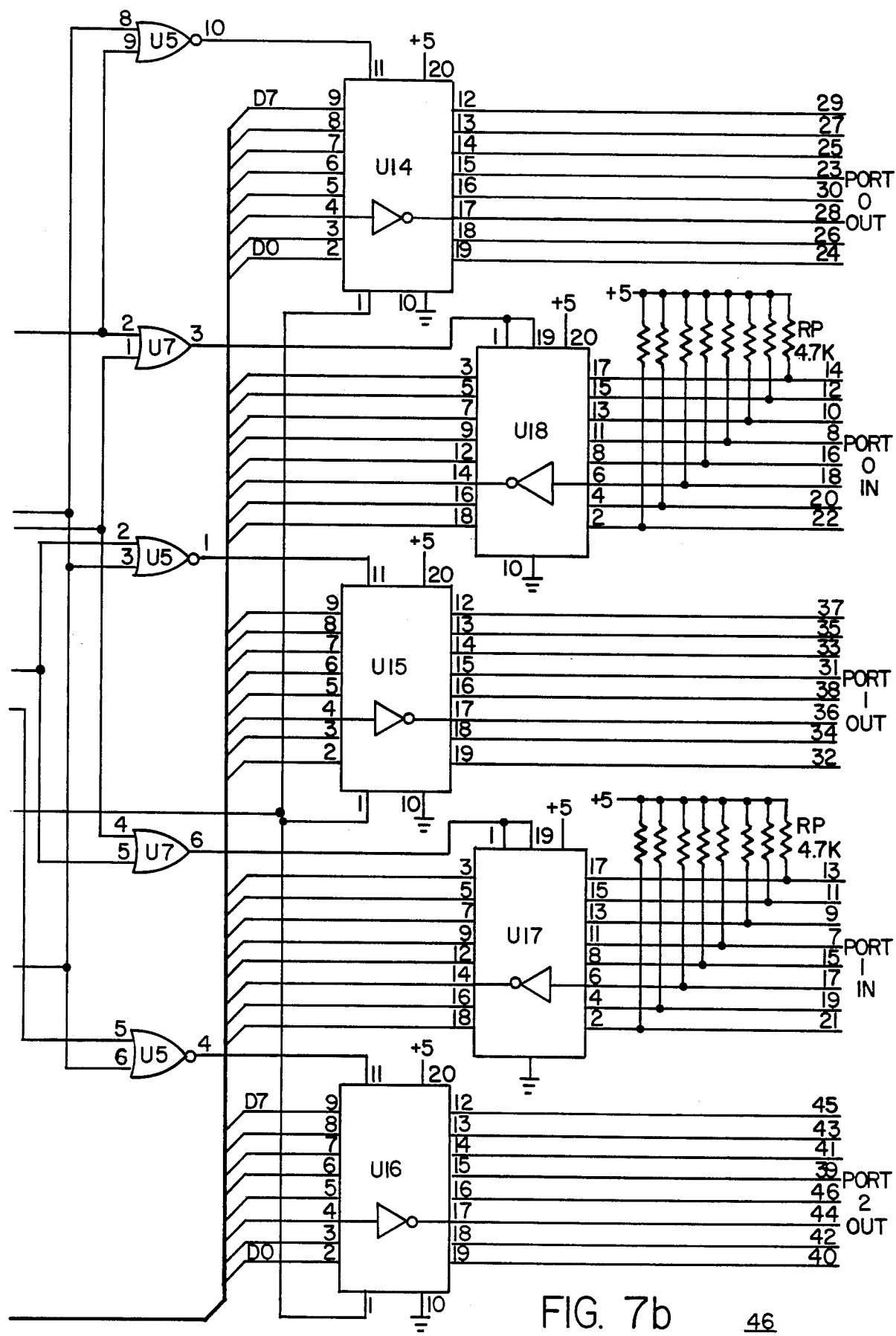

A conventionally structured microcomputer 46 is depicted in FIGS. 7a and 7b. Therein, a central processor, such as the Intel 8085 microprocessor is connected by address and address/data buses to address decoders U2, and U3. An address/data selector U6 enables both data and the lower 8 address bits to use the same pins of the microcomputer as a known characteristic of this particular microprocessor. Read only memories, U10, U111, U12 and U13 are selected by the address decoder U3. Random access memories U8 and U9 are provided for storing values developed during program execution. Tristate buffers U14, U15, U16, U17 and U18 are selected by address decoder U2 and buffer incoming and outgoing binary signals which pass via the backplane to the other modules of the line center unit 16.

BRIEF DESCRIPTION OF WIRE CENTER PROGRAM

The wire center control program is written in 29 parts as indicated by the numbers in the margins. The functions of each part appear from the remarks provided therein. Part 1 is a declaration table equating mnemonic phrases to memory locations.

At power up to reset, the program jumps to the vectors and code tables (lines 128–155) and to the initialization code in Part 2 (lines 121–190). Part 2 also checks the data in the 100 byte line memory area of the random access memory U8, U9, at line 105, to see if it is valid. If the memory area does not contain valid data, the memory area is refreshed by scanning all 100 control lines and saving the current status of the line switches (lines 191–219).

Part 3, the main loop, controls the flashing circuit assurance light emitting diode (LED) located on the communications module 44 (line 236), checks for incoming tones (line 375), and checks the field switches for changes in status every time the LED flashes the number of times defined at line 77. Part 4 is the test for incoming tones. Part 5 gets the tone and checks it to see if it is a *command* tone (line 383) or a *numeric* tone.

Commands are processed at Parts 6, 13 and 14. A numeric tone, which is used to select a line is processed in part 7. Once two numeric tones have been received, a control line is selected (line 423).

Part 8 reads the status of the field switch. The heart of this operation is found in the subroutine located in Part 15. Here, code in Parts 16 and 17 are used to read the condition of the line and determine if the TIP and RING polarity is correct. The results of these operations are returned to Part 7 and transmitted via tone at Part 10. This process continues until the wire center is reset, or until an Execute *command* tone is received (Part 11) between the outgoing status tones.

Part 12 handles the execute operation and contains the algorithm for detecting the line pulse indicating the field switch has operated. On receiving the pulse or at time out (line 65), the wire center resumes the status checking operation on the selected line.

When the wire center is reset, the selected line is deselected and the program resumes checking the field switches for changes of status at Part 3.

Here follows a computer control program for use with the microcomputer 46. This program is written in accordance with the CP/M Macro Assembler Version 2.0.

```
CP/M MACRO ASSEM 2.0   #001   PDACS   CYEG-200 11-WC-CPU   GENERIC 0002  10/09/85

1                    PAG.    82
  2              A TITLE  'PDACS   CYEG-200 11-WC-CPU   GENERIC 0002  10/09/85'
  3
  4              ; ************************************************************
  5              ; *                     WIRECENTER UNIT                      *
  6              ; ************************************************************
  7              ;
  8              ;
  9              ;
 10              ;
 11              ;
 12              ;
 13              ;
 14              ;
 15              ;
 16              $+PRINT
 17                    PAGE
 18
 19              ;THE WIRE CENTER UNIT USES TWO IN/OUT PORTS AND A SINGLE OUT ONLY PORT.
 20              ;THE PORTS ARE ASSIGNED AS FOLLOWS.
 21              ;PORT 0:
 22              ;        OUT - XTLEDDDD   T=TRANSMITT L=LED E=ENABLE D=BITS FOR DTMF OUT
 23              ;        IN  - XXXVDDDD   X=NOT USED  V=DATA VALID   D=DATA RECEIVED DTMF
 24              ;PORT 1:
 25              ;        OUT - RCXXXXXX   R=T/R REVERSAL RELAY C=CHARGE RELAY
 26              ;        IN  - XXCVVVVV   X=NOT USED  V=VOLT METER OUT  C=CHARGE FINISH
 27              ;PORT 2:
 28              ;        OUT - MMMMLLLL   BCD LINE SELECT M=MSD L=LSD
 29              ;
 30              ;        THERE ARE ONLY SIX VALID VOLTMETER OUTPUTS.  EACH OUTPUT PRODUCES
 31              ;A DTMF TONE TO LIGHT A MESSAGE AT THE CONTROL UNIT.  THE LIST BELOW GIVES
 32              ;THE SIX OUTPUTS, THEIR HEX VALUE AND THE DTMF TONE TO BE SENT IN RESPONCE.
 33              ;
 34              ;        11111   ; 1F   5
 35              ;        01111   ; 0F   8
 36              ;        00111   ; 07   6
 37              ;        00011   ; 03   4
 38              ;        00001   ; 01   2
 39              ;        00000   ; 00   0
 40
 41
 42              ;OPTIONS:
 43              ;  MINSCAN - WHEN SET FALSE FORCES THE WIRECENTER TO CALL THE CONSOLE ANY
 44              ;            TIME THAT THERE IS A CHANGE IN STATUS ON ANY TERMINAL.  WHEN SET
 45              ;            TRUE, THE WIRE CENTER ONLY CALLS THE CONSOLE ON A STATUS CHANGE ON
 46              ;            TERMINAL 90-99, OR A CHANGE TO OPEN OR SHORT ON TERMINAL 00-89.
 47              ;
 48              ;  CHGTIM  - WHEN SET TRUE THE 130V CHARGE IS REMOVED AFTER A TIMEOUT PERIOD
 49              ;            IF END OF CHARGE IS NOT DETECTED.  IF FALSE THE 130V CONTINUES UNTIL
 50              ;            THE END OF CHARGE IS DETECTED OR THE WIRECENTER IS RESET.
 51              ;
 52              ;  TRREV   - ASSEMBLE FOR AUTO TIP/RING REVERSAL.
 53              ;
 54              ;  FLSLEEP - WHEN SET TRUE THE TONE THAT INHIBITS CONSOLE FLUTTERING IS
 55              ;            DISABLED WHEN SCANNING IS DISABLED.  IF SET FALSE, FLUTTER INHIBIT
 56              ;            TONES ARE SENT EVEN IF THE SCAN IS DISABLED.
 57
 58                    PAGE
```

```
59
60   0000 =            FALSE    EQU     0
61   FFFF =            TRUE     EQU     NOT FALSE
62
63                     ;ASSEMBLY OPTIONS
64   FFFF =            MINSCAN  EQU     TRUE          ;TRUE=REPORT OPEN OR SHORT ONLY ON 00-89 SCAN
65   FFFF =            CHGTIM   EQU     TRUE          ;TRUE=KILL 130V IF NO CHG END DETECT
66   FFFF =            TRREV    EQU     TRUE          ;TRUE=AUTO T/R REVERSE TESTING
67   0000 =            FLSLEEP  EQU     FALSE         ;TRUE=CONSOLE FLUTTERS IF SCAN IS DISABLED
68   0000 =            IVIBIT0  EQU     00000000B     ;PORT 0 INPUT MASK
69   00AF =            IVOBIT0  EQU     10101111B     ;PORT 0 OUTPUT MASK
70   0000 =            IVIBIT1  EQU     00000000B     ;PORT 1 INPUT MASK
71   0000 =            IVOBIT1  EQU     00000000B     ;PORT 1 OUTPUT MASK
72   00FF =            IVOBIT2  EQU     11111111B     ;PORT 2 OUTPUT MASK
73
74                     ;VALUES
75   000B =            ONHOOK   EQU     0BH           ;DTMF TO FORCE SCAN WITHOUT DELAY
76   0FA0 =            FLCNT    EQU     4000          ;FLASH RATE OF LED DURING IDLE LOOP
77   0008 =            SCNCNT   EQU     8             ;NUMBER OF FLASHES BETWEEN LINE TESTS
78   00FF =            KEY      EQU     0FFH
79   00FF =            NOLINE   EQU     0FFH          ;WRITTEN TO PORT 2 TO DESELECT LINES
80   005A =            STATOK   EQU     01011010B     ;WRITTEN TO REFSTAT IF LIN MEMORY IS VALID
81   000B =            FLINHIB  EQU     0BH           ;TONE SENT TO CONSOLE THAT PREVENTS FLUTTER
82   0000 =            STATCHG  EQU     00H           ;TONE SENT TO ALEART CONSOLE OF STATUS CHANGE
83   00FF =            SETFLAG  EQU     0FFH
84   1F40 =            TTTO     EQU     8000          ;TIME TIL TIMEOUT FOR "QUIET" TONE TO ARRIVE
85   0000 =            CLRFLAG  EQU     0
86
87                     ;MEMORY (RAM)
88   2000 =            LINEM    EQU     02000H        ;HOLDS MSD LINE SELECT (XXXXMMMM)
89   2001 =            LINEL    EQU     LINEM+1       ;HOLDS LSD LINE SELECT (XXXXLLLL)
90   2002 =            LINE     EQU     LINEL+1       ;LINE SELECTED STORED HERE
91   2003 =            PORT0    EQU     LINE+1        ;LAST OUT TO PORT0
92   2004 =            PORT1    EQU     PORT0+1       ;HOLDS LAST OUT TO PORT1
93   2005 =            PORT2    EQU     PORT1+1       ;HOLDS LAST OUT TO PORT2
94   2006 =            SCNDTA   EQU     PORT2+1       ;TEMPORARY HOLDING FOR SCAN DATA
95   2007 =            NXTSCN   EQU     SCNDTA+1      ;HOLDS COUNT OF FLASHES TO NEXT SCAN
96   2008 =            SCNLIN   EQU     NXTSCN+1      ;HOLDS ADDRESS OF LINE SCANNED
97   2009 =            LINSCN   EQU     SCNLIN+1      ;HOLDS LINE WITH KNOWN STATUS CHANGE OR 0FFH
98   200A =            CHGSCN   EQU     LINSCN+1      ;HOLDS LINE TO SCAN WHEN LOOKING FOR CHANGES
99   200B =            ALARMF   EQU     CHGSCN+1      ;SET TRUE ON CALL TO OPERATOR, CLEARED AT RESET
100  200C =            REFSTAT  EQU     ALARMF+1      ;5A HELD HERE WHEN ALL LINES HAVE BEEN TESTED
101  200D =            SCNSTAT  EQU     REFSTAT+1     ;00=SCAN ALL/0F=SCAN RECLOSERS ONLY/FF=NO SCAN
102  200E =            CODEPNT  EQU     SCNSTAT+1     ;2 BYTE CODE POINTER
103  2010 =            FREPRTC  EQU     CODEPNT+2     ;SET IF REPORTING CHANGES OF STATUS
104  2011 =            FREPRTA  EQU     FREPRTC+1     ;SET IF RUNNING REPORT OF ALL STATUS
105  2100 =            LINMEM   EQU     02100H        ;100 BYTE LINE MEMORY AREA
106  23FF =            STACK    EQU     023FFH
107
108                    ;CONTROL BITS
109  0020 =            LED      EQU     00100000B     ;CONFIDENCE LED
110  0010 =            DTMFV    EQU     00010000B     ;DTMF DATA VALID
111  0020 =            CHGEND   EQU     00100000B     ;CHARGE MASK
112  0040 =            CHG      EQU     01000000B     ;CHARGE RELAY
113  0040 =            XMT      EQU     01000000B     ;CONNECT TRANSMITTER TO LINE
114  0080 =            REV      EQU     10000000B     ;T/R REVERSE RELAY
115  0080 =            E130V    EQU     10000000B     ;/GTE/ ENABLE 130V
116  0000 =            IDLE0    EQU     00000000B     ;IDLE PORT 0
117  0028 =            IDLE1    EQU     00101000B     ;IDLE PORT 1
118                    PAGE
119
120  0000                       ORG     0
121  0000 C3A200                JMP     RESET
122
123                    ;ALL UNUSED INTERRUPTS ARE VECTORED TO 0
124                             IRP     X,(8,10,18,20,24,28,2C,30,34,38,3C)
125                             ORG     X&H
126                             RST     0
127                             ENDM
128  0008+                      ORG     8H
129  0008+C7                    RST     0
130  0010+                      ORG     10H
131  0010+C7                    RST     0
132  0018+                      ORG     18H
133  0018+C7                    RST     0
```

```
134  0020+                        ORG    20H
135  0020+C7                      RST    0
136  0024+                        ORG    24H
137  0024+C7                      RST    0
138  0028+                        ORG    28H
139  0028+C7                      RST    0
140  002C+                        ORG    2CH
141  002C+C7                      RST    0
142  0030+                        ORG    30H
143  0030+C7                      RST    0
144  0034+                        ORG    34H
145  0034+C7                      RST    0
146  0038+                        ORG    38H
147  0038+C7                      RST    0
148  003C+                        ORG    3CH
149  003C+C7                      RST    0
150  003D 0C000D0EFFCODE          DB     0CH,00,0DH,0EH,0FFH
151  0042 2020202020              DB     '
152  005B 434F4E5741              DB     '
153  007A 414C4C2052              DB     '
154  0093 40424446648RCTBL        DB     40H,42H,44H,46H,48H,60H,62H,64H,66H,68H,80H,82H,84H,86H
155  00A1 FF                      DB     0FFH           ;<-- END OF RECLOSER TABLE
156  00A2 =          RESET        EQU    $
157  00A2 3EFA                    MVI    A,250
158  00A4 320720                  STA    NXTSCN         ;LONG TIME TIL FIRST SCAN AFTER RESET
159  00A7 3E00                    MVI    A,0
160  00A9 321120                  STA    FREPRTA        ;START UP IN NORMAL MODE
161  00AC 320D20                  STA    SCNSTAT        ;ANY RESET ENABLES SCANNING
162  00AF 31FF23    INIT          LXI    SP,STACK       ;SET THE STACK
163  00B2 3EFF                    MVI    A,NOLINE
164  00B4 CDD904                  CALL   OUT2           ;WRITE ONE TO ALL THE PORTS
165  00B7 3E00                    MVI    A,IDLE0
166  00B9 CDC904                  CALL   OUT0
167  00BC 3E28                    MVI    A,IDLE1        ;PORT 1 IDLE
168  00BE CDD104                  CALL   OUT1
169  00C1 213D00                  LXI    H,CODE         ;INIT CODE POINTER AFTER ANY RESET
170  00C4 220E20                  SHLD   CODEPNT
171                               PAGE
172
173                   ;CHECK FOR A SECOND TONE WITHIN 50MS.
174  00C7 11401F                  LXI    D,TTTO
175  00CA DB00      RESET1        IN     0
176  00CC E610                    ANI    DTMFV
177  00CE CAE100                  JZ     RESET2         ;NO TONE RECEIVED YET, LOOP TIL TIMEOUT
178                   ;GOT A TONE, CHECK FOR HANGUP
179  00D1 CD4405                  CALL   RDTMF          ;GET THE TONE
180  00D4 FE0B                    CPI    ONHOOK
181  00D6 C24B02                  JNZ    TONEIN         ;IT WAS NOT HANGUP
182  00D9 3ED6                    MVI    A,SCNCNT-50
183  00DB 320720                  STA    NXTSCN
184  00DE C3AF00                  JMP    INIT           ;WE ARE ON HOOK, LOOK FOR CHANGES
185  00E1 1B        RESET2        DCX    D
186  00E2 7A                      MOV    A,D
187  00E3 B3                      ORA    E
188  00E4 C2CA00                  JNZ    RESET1
189  00E7 C3EA00                  JMP    INIT0          ;TIMEOUT ASSUME OFF HOOK
190                   ;TEST TO SEE IF LINE MEMORY HAS VALID REFERENCES
191  00EA 3A0C20    INIT0         LDA    REFSTAT
192  00ED FE5A                    CPI    STATOK         ;SEE IF OK
193  00EF CA2D01                  JZ     INIT1          ;SKIP IF ALRIGHT
194  00F2 CDFA04                  CALL   ON130          ;/GTE/ POWER ON FOR TEST
195  00F5 3E99                    MVI    A,99H          ;FIRST TO TEST
196  00F7 320820                  STA    SCNLIN         ;FIRST TO SCAN
197  00FA 3E00                    MVI    A,0
198  00FC F5        REFSET        PUSH   PSW            ;SAVE LINE NUMBER
199  00FD CD9004                  CALL   LINLOC         ;GET THE STORAGE LOCATION
200  0100 E5                      PUSH   H              ;SAVE THE ADDRESS
201  0101 CDD904                  CALL   OUT2           ;SELECT THE LINE
202  0104 CDBC05                  CALL   D200MS
203  0107 CD3904                  CALL   READSW
204  010A E1                      POP    H
205  010B 77                      MOV    M,A            ;SAVE THE READING
206  010C F1                      POP    PSW
207  010D C601                    ADI    1
208  010F 27                      DAA
```

```
209   0110 C2FC00           JNZ    REFSET        ;LOOP TIL ALL TESTED
210   0113 3A0320           LDA    PORT0         ;/GTE/ GET LAST OUT
211   0116 EE80             XRI    E130V         ;/GTE/
212   0118 CDC904           CALL   OUT0          ;/GTE/ 130V OFF
213   011B 3E5A             MVI    A,STATOK
214   011D 320C20           STA    REFSTAT       ;SHOW REFERENCE MEMORY IS VALID
215   0120 3E00             MVI    A,FALSE
216   0122 320B20           STA    ALARMF        ;CLEAR ALARM FALG AT POWER UP
217   0125 3EFF             MVI    A,NOLINE
218   0127 320920           STA    LINSCN
219   012A CDD904           CALL   OUT2          ;DESELECT ANY LINE
220                         PAGE
221
222   012D =        INIT1   EQU    $
223   012D 3A0B20           LDA    ALARMF        ;GET THE FLAG TELLING OF ALARM IN PROGRESS
224   0130 A7               ANA    A
225   0131 C23901           JNZ    INIT2         ;IF ALARM IN PROGRESS
226   0134 3EFF             MVI    A,NOLINE
227   0136 320920           STA    LINSCN        ;VALUE IN LINSCN INVALID IF NO ALARM
228   0139 3E00     INIT2   MVI    A,FALSE
229   013B 320B20           STA    ALARMF        ;IN ANY CASE CLEAR THE ALARM FLAG WE'VE SEEN IT
230   013E 21A00F           LXI    H,FLCNT       ;LED FLASH RATE
231   0141 2B       FLASH   DCX    H
232   0142 7D               MOV    A,L
233   0143 B4               ORA    H
234   0144 C24102           JNZ    TSTAT         -;SKIP THE FLASH & CHECK TONE STATUS
235   0147 3A0320   FLASH1  LDA    PORT0         ;GET THE CURRENT BYTE
236   014A EE20             XRI    LED           ;IF LED ON TURN OFF, IF OFF TURN ON
237   014C CDC904           CALL   OUT0
238                         PAGE
239
240            ;THE NUMBER OF LED FLASHES ARE CHECKED TO SEE IF IT IS TIME TO SCAN
241   014F 3A0720   SCANCK  LDA    NXTSCN        ;GET THE COUNTER
242   0152 3D               DCR    A
243   0153 320720           STA    NXTSCN
244   0156 C2C501           JNZ    SCNEND        ;IF NOT TIME TO CHECK A LINE
245   0159 3E08             MVI    A,SCNCNT
246   015B 320720           STA    NXTSCN        ;RESET THE COUNTER
247   015E 3A0D20           LDA    SCNSTAT       ;CHECK THE STATUS
248   0161 FEFF             CPI    0FFH          ;SEE IF ALL OFF
249                         IF     FLSLEEP
250                         JZ     SCNEND        ;CONTINUE WITHOUT BEEP
251                         ELSE
252   0163 C26C01           JNZ    SCAN          ;CONTINUE TO SCAN
253   0166 CD8204           CALL   BEEP          ;SEND THE TONE TO INHIBIT FLUTTER
254   0169 C3C501           JMP    SCNEND        ;BUT DONT SCAN
255                         ENDIF
256   016C 3A0820   SCAN    LDA    SCNLIN
257   016F C601     SCAN1   ADI    01H
258   0171 27               DAA                  ;GET THE LINE TO TEST (BCD)
259   0172 320820           STA    SCNLIN        ;SAVE THE INCREMENTED ADDRESS
260   0175 CDA901           CALL   CFR           ;SEE IF IT IS A RECLOSER TERMINAL
261   0178 DA6F01           JC     SCAN1         ;GO BACK IF TERMINAL FOUND IN RECLOSER TABLE
262   017B F5       SCAN2   PUSH   PSW           ;SAVE THE LINE NUMBER
263   017C 3A0D20           LDA    SCNSTAT
264   017F A7               ANA    A
265   0180 C29201           JNZ    SCAN3         ;DO RECLOSERS
266   0183 CD8204           CALL   BEEP
267   0186 3E00             MVI    A,00H
268   0188 320A20           STA    CHGSCN        ;THIS IS HELD AT 00 ONCE AUTO SCAN STARTS
269   018B 321020           STA    FREPRTC
270   018E F1               POP    PSW
271   018F CDD001           CALL   SCAN5         -;CHECK TO SEE IF ANY CHANGE IN STATUS
272            ;ALL RECLOSER TERMINALS ARE CHECKED AFTER ANY LINE TERMINAL IS CHECKED.
273   0192 219300   SCAN3   LXI    H,RCTBL       ;POINT AT TOP OF RECLOSER TABLE
274   0195 3E00     SCAN4   MVI    A,CLRFLAG
275   0197 321020           STA    FREPRTC
276   019A 7E               MOV    A,M           ;GET A RECLOSER LINE NUMBER FROM THE TABLE
277   019B 23               INX    H
278   019C FEFF             CPI    0FFH          ;IS THIS THE END OF THE TABLE
279   019E CAC501           JZ     SCNEND
280   01A1 E5               PUSH   H
281   01A2 CDD001           CALL   SCAN5         ;CHECK FOR STATUS CHANGE
282   01A5 E1               POP    H
283   01A6 C39501           JMP    SCAN4         ;CONTINUE TIL ALL TEN SCANED
```

```
284
285             ;THIS ROUTINE IS CALLED TO DETERMINE IF A TERMINAL IS ASSIGNED TO A RECLOSER.
286             ;AT ENTRY ACC CONTAINS THE TERMINAL NUMBER. IF THE NUMBER MATCHES AN ENTRY
287             ;IN THE RCTBL THE ROUTINE RETURNS WITH THE 'C' FLAG SET. THE 'C' FLAG IS
288             ;CLEAR IF THE TERMINAL IS NOT IN THE TABLE.
289   01A9 =            CFR     EQU     $
290   01A9 F5                   PUSH    PSW
291   01AA C5                   PUSH    B
292   01AB E5                   PUSH    H
293   01AC 47                   MOV     B,A             ;SAVE LINE NUMBER IN B
294   01AD 219300               LXI     H,RCTBL         ;POINT AT TOP OF TABLE
295   01B0 7E           CFR1    MOV     A,M             ;GET A BYTE FROM THE TABLE
296   01B1 23                   INX     H               ;POINT AT THE NEXT
297   01B2 FEFF                 CPI     0FFH            ;Q: IS THIS THE END OF THE TABLE
298   01B4 CAC001               JZ      CFR2            ;BR IF END OF TABLE
299   01B7 B8                   CMP     B               ;Q: DOES TABLE BYTE MATCH TERMINAL NUMBER
300   01B8 C2B001               JNZ     CFR1            ;BR TO CHECK NEXT BYTE IN TABLE
301   01BB E1                   POP     H
302   01BC C1                   POP     B
303   01BD F1                   POP     PSW
304   01BE 37                   STC                     ;CARRY SET TO FLAG RECLOSER TERMINAL
305   01BF C9                   RET
306   01C0 E1           CFR2    POP     H
307   01C1 C1                   POP     B
308   01C2 F1                   POP     PSW
309   01C3 A7                   ANA     A               ;CLEAR CARRY, NO MATCH IN TABLE
310   01C4 C9                   RET
311                             PAGE
312
313   01C5 3EFF         SCNEND  MVI     A,NOLINE
314   01C7 CDD904               CALL    OUT2
315   01CA 21A00F               LXI     H,FLCNT         ;BACK TO FLASHING
316   01CD C34102               JMP     TSTAT
317   01D0 F5           SCAN5   PUSH    PSW
318   01D1 320920               STA     LINSCN          ;SAVE IN CASE OF STATUS CHANGE
319   01D4 CD9004               CALL    LINLOC          ;GET THE STORAGE ADDRESS
320   01D7 E5                   PUSH    H
321   01D8 CDD904               CALL    OUT2            ;SELECT THE LINE
322   01DB CDBC05               CALL    D200MS
323   01DE CD3904               CALL    READSW          ;GET THE READING
324   01E1 F5                   PUSH    PSW             ;STACK THE READING
325   01E2 3EFF                 MVI     A,NOLINE
326   01E4 CDD904               CALL    OUT2            ;DESELECT THE LINE
327   01E7 F1                   POP     PSW             ;READING
328   01E8 E1                   POP     H               ;STORAGE ADDRESS
329   01E9 BE                   CMP     M               ;SEE IF SAME AS BEFORE
330   01EA CA0102               JZ      SCAN6           ;IF THE READING IS SAME AS BEFORE
331   01ED 3A0920               LDA     LINSCN          ;GET THE LINE WE ARE LOOKING AT
332   01F0 FE88                 CPI     88H             ;IS IT THE TEST LINE?
333   01F2 CA0102               JZ      SCAN6           ;IGNORE CHANGES ON TEST LINE
334   01F5 3A1020               LDA     FREPRTC         ;SEE IF AUTO SCAN OR COMMAND SCAN
335   01F8 A7                   ANA     A
336   01F9 CA0802               JZ      SCAN7           ;UNEQUAL READING ON AUTO SCAN
337   01FC F1                   POP     PSW
338   01FD E1                   POP     H               ;RETURN ADDRESS OFF THE STACK
339   01FE C3BD03               JMP     REPRTC          ;SELECT LINE AND SEND DATA TO THE CONSOLE
340   0201 3EFF         SCAN6   MVI     A,0FFH
341   0203 320920               STA     LINSCN          ;NO CHANGE IN STATUS TO REPORT
342   0206 F1                   POP     PSW
343   0207 C9                   RET
344             ;SEND STATUS CHANGE TONE IF CHANGE TO OPEN OR SHORT OR IF ANY RECLOSER CHANGE.
345             ;REPORT ANY CHANGE ON 00-99 AS WELL IF MINSCAN IS SET FALSE.
346   0208 =           SCAN7    EQU     $
347                             IF      MINSCAN
348   0208 3A0920               LDA     LINSCN          ;SEE WHAT LINE WE ARE ON
349   020B CDA901               CALL    CFR             ;IS IT A RECLOSER?
350   020E DA1E02               JC      SCAN8           ;ANY RECLOSER CHANGE IS REPORTED
351   0211 3A0620               LDA     SCNDTA          ;GET THE CHANGED STATUS
352   0214 FE00                 CPI     0               ;IS IT A CHANGE TO SHORT?
353   0216 CA1E02               JZ      SCAN8           ;REPORT IT
354   0219 FE1F                 CPI     1FH             ;OR A CHANGE TO OPEN?
355   021B C20102               JNZ     SCAN6           ;OTHER CHANGES ON 00-89 IGNORED
356                             ENDIF
357   021E F1           SCAN8   POP     PSW
358   021F E1                   POP     H               ;CLEAR RETURN ADDRESS OFF STACK
```

```
359  0220 3EFF        SCAN9   MVI   A,TRUE
360  0222 320B20              STA   ALARMF       ;TURN ON THE ALARM FLAG
361  0225 3E00                MVI   A,STATCHG
362  0227 CD1E05              CALL  DTMFON       ;START THE STATUS CHANGE TONE
363  022A CDB605              CALL  D500MS
364  022D CD3005              CALL  DTMFOFF
365  0230 3E0B                MVI   A,FLINHIB
366  0232 CD1E05              CALL  DTMFON
367  0235 CDC205              CALL  D50MS
368  0238 CD3005              CALL  DTMFOFF
369  023B CDB905              CALL  D400MS
370  023E C32002              JMP   SCAN9
371                           PAGE
372
373                  ;LOOK FOR INCOMMING DTMF
374  0241 DB00       TSTAT    IN    0
375  0243 E610                ANI   DTMFV        ;CHECK THE DATA VALID BIT
376  0245 CA4101              JZ    FLASH        ;JUMP IF NO TONE IN
377
378                  ;PROCESS THE TONE
379  0248 CD4405              CALL  RDTMF        ;GET THE TONE AT END OF DATA VALID
380  024B =          TONEIN   EQU   $
381  024B FE0A                CPI   0AH          ;IS IT NUMERIC?
382  024D DA8002              JC    LSGET
383  0250 FE0C                CPI   0CH          ;IS IT THE BEGINNING OF A COMMAND?
384  0252 C2AF00              JNZ   INIT
385                  ;GET THE COMMAND AND JUMP THERE.....
386  0255 DB00       CMDIN    IN    0            ;READ THE DTMF PORT
387  0257 E610                ANI   DTMFV
388  0259 CA5502              JZ    CMDIN        ;LOOP HERE TIL INPUT
389  025C CD4405              CALL  RDTMF
390  025F FE01                CPI   1            ;DISABLE ALL?
391  0261 CA9D03              JZ    DISABA
392  0264 FE02                CPI   2            ;DISABLE SOME? (ALL EXCEPT RECLOSER)
393  0266 CAA503              JZ    DISABS
394  0269 FE03                CPI   3            ;RESET STATUS TO CURRENT CONDITIONS?
395  026B CAAD03              JZ    RESETS
396  026E FE09                CPI   9
397  0270 CAB503              JZ    DTMFT        ;DTMF LEVEL TEST
398  0273 FE05                CPI   5
399  0275 CABD03              JZ    REPRTC       ;SELECT CHANGED STATUS LINE AND REPORT
400  0278 FE06                CPI   6
401  027A CAF803              JZ    REPRTA       ;REPORT ALL STATUS
402  027D C3AF00              JMP   INIT         ;NOT A COMMAND
403                           PAGE
404
405                  ;PROCESS THE LINE SELECT COMMAND
406
407  0280 CDFA04     LSGET    CALL  ON130        ;/GTE/
408  0283 210020              LXI   H,LINEM      ;POINT AT STORAGE LOCATION
409  0286 77                  MOV   M,A          ;SAVE IT
410  0287 DB00       LSGET1   IN    0
411  0289 E610                ANI   DTMFV
412  028B CA8702              JZ    LSGET1
413  028E CD4405              CALL  RDTMF        ;GET THE TONE
414  0291 FE0A                CPI   0AH
415  0293 D2AF00              JNC   INIT         ;NON VALID, START OVER
416  0296 23                  INX   H
417  0297 77                  MOV   M,A          ;SAVE IT
418  0298 2B                  DCX   H
419  0299 07070707            RLC!RLC!RLC!RLC    ;SWAP NIBBLES
420  029D B6                  ORA   M            ;ADD UPPER NIBBLE
421  029E 07070707            RLC!RLC!RLC!RLC    ;ROTATE BACK
422  02A2 320220     LSGET2   STA   LINE         ;SAVE THE BCD IN ONE BYTE
423  02A5 CDD904              CALL  OUT2         ;AND WRITE IT TO THE PORT
424  02A8 CDB605              CALL  D500MS
425
426                  ;THE LINE IS SELECTED SO THE VOLT METER WILL BE SWITCHED ON AND READ
427
428  02AB 3A0420     READV    LDA   PORT1
429  02AE E6BF                ANI   NOT CHG      ;TURN OFF THE CHARGE RELAY
430  02B0 CDD104              CALL  OUT1
431  02B3 3A0320              LDA   PORT0        ;CLEAR DIRECTION AND CHARGE
432  02B6 E6BF                ANI   NOT XMT
433  02B8 F620                ORI   LED
434  02BA CDC904              CALL  OUT0
```

```
435  02BD CD3005           CALL   DTMFOFF    ;ALL DTMF OFF
436  02C0 CDBC05           CALL   D200MS
437  02C3 3A0220   READV0  LDA    LINE       ;GET LINE NUMBER
438  02C6 CD9004           CALL   LINLOC     ;GET MEMORY ADDRESS IN H/L
439  02C9 CD3904           CALL   READSW     ;GET THE VALUE
440  02CC 77               MOV    M,A        ;SAVE THE RESULT
441  02CD DADB02           JC     LOCK
442  02D0 21B005   READV1  LXI    H,OUTTAB   ;POINT TO OUTPUT TABLE
443  02D3 1F       READV2  RAR               ;ROTATE RIGHTMOST INTO CARRY
444  02D4 D21003           JNC    XMIT       ;FOUND A ZERO TRANSMIT THE TONE
445  02D7 23               INX    H
446  02D8 C3D302           JMP    READV2     ;CONTINUE UNTIL ZERO FOUND
447
448  02DB F5       LOCK    PUSH   PSW        ;SAVE THE SHORT OR OPEN
449  02DC 3EFF             MVI    A,NOLINE
450  02DE CDD904           CALL   OUT2
451  02E1 3E28             MVI    A,IDLE1
452  02E3 CDD104           CALL   OUT1
453  02E6 F1               POP    PSW
454  02E7 A7               ANA    A
455  02E8 C2F802           JNZ    LOCK1      ;MUST BE OPEN
456  02EB 3E00             MVI    A,0
457  02ED CD1E05           CALL   DTMFON     ;TRANSMITT A ZERO
458  02F0 3A1120           LDA    FREPRTA
459  02F3 A7               ANA    A
460  02F4 C0               RNZ               ;RETURN IF THIS IS END OF CALL TO LSGET2
461  02F5 C30203           JMP    LOCK2
462  02F8 3E05     LOCK1   MVI    A,5
463  02FA CD1E05           CALL   DTMFON     ;TRANSMITT A FIVE
464  02FD 3A1120           LDA    FREPRTA
465  0300 A7               ANA    A
466  0301 C0               RNZ               ;RETURN IF END OF CALL TO LSGET2
467  0302 3A0320   LOCK2   LDA    PORT0
468  0305 EE60             XRI    XMT+LED
469  0307 CDC904           CALL   OUT0
470  030A CDB605           CALL   D500MS
471  030D C30203           JMP    LOCK2      ;LOOP TILL RESET
472                        PAGE
473
474              ;H/L HAS THE ADDRESS OF THE TONE WHICH IS TO BE SENT EVERY 500MS.
475
476  0310 =       XMIT     EQU    $
477  0310 7E               MOV    A,M        ;GET THE TONE
478  0311 CD1E05           CALL   DTMFON     ;TONE ON
479  0314 3A1120           LDA    FREPRTA    ;SEE IF LSGET2 WAS CALLED AS SUBROUTINE
480  0317 A7               ANA    A
481  0318 C0               RNZ               ;RETURN IF SUBROUTINE FLAG IS SET
482  0319 CDB605           CALL   D500MS     ;TONE LENGTH
483  031C CD3005           CALL   DTMFOFF    ;TONE OFF
484
485              ;LOOK FOR CHG COMMAND FOR 500 MS
486
487  031F 01C2A2   RELOAD  LXI    B,41666    ;NUMBER OF LOOPS WATCHING FOR DTMF
488  0322 DB00     WAIT500 IN     0
489  0324 E610             ANI    DTMFV
490  0326 C23203           JNZ    TEST4E     ;SEE IF WE GOT AN E
491  0329 0B               DCX    B
492  032A 78               MOV    A,B
493  032B B1               ORA    C
494  032C C22203           JNZ    WAIT500
495  032F C3C302           JMP    READV0     ;RE-READ THE VOLTMETER
496  0332 CD4405   TEST4E  CALL   RDTMF
497  0335 2A0E20           LHLD   CODEPNT
498  0338 46               MOV    B,M        ;GET THE CODE BYTE TO COMPAIR
499  0339 B8               CMP    B          ;SEE IF THEY MATCH
500  033A C25003           JNZ    CODERR
501  033D 23               INX    H
502  033E 220E20           SHLD   CODEPNT    ;UPDATE THE POINTER
503  0341 7E               MOV    A,M
504  0342 FEFF             CPI    0FFH       ;PROCESSED LAST IN CODE?
505  0344 C21F03           JNZ    RELOAD     ;RELOAD THE WAIT COUNTER AND WAIT FOR NEXT
506  0347 213D00           LXI    H,CODE
507  034A 220E20           SHLD   CODEPNT    ;RESET THE CODE POINTER
508  034D C36C03           JMP    CHARGE     ;OPERATE THE SWITCH
509              ;THE PROGRAM ENDS UP HERE WHEN A TERMINAL IS SELECTED BUT THE RECEIVED DTMF
```

```
510                                ;IS NOT PART OF THE EXICUTE SEQUENCE. AT THIS TIME THE THE LINE NUMBER IS
511                                ;CHECKED TO SEE IF WE ARE ON 88 AND IF THE DTMF IS *. IN THIS CASE THE SWITCH
512                                ;EXICUTES. (LINE 88 IS THE TEST LINE).
513    0350 =          CODERR  EQU    $
514    0350 3A0220             LDA    LINE            ;GET THE NUMBER OF THE CURRENTLY SELECTED LINE
515    0353 FE88               CPI    88H             ;IS IT THE TEST LINE?
516    0355 C26303             JNZ    CODERR1         ;NOT THE TEST LINE
517                                ;SINCE WE ARE ON THE TEST LINE CHECK FOR A RECIEVED STAR
518    0358 CDBF04             CALL   IN0             ;GET THE LAST IN
519    035B CD7805             CALL   DTMFHEX         ;CONVERT TO HEX
520    035E FE0E               CPI    0EH             ;IS IT A STAR
521    0360 CA6C03             JZ     CHARGE          ;THROW THE SWITCH
522                                ;RESET THE EXICUTE CODE POINTERS FOR THE NEXT TRY
523    0363 213D00     CODERR1 LXI    H,CODE
524    0366 220E20             SHLD   CODEPNT
525    0369 C32203             JMP    WAIT500
526
527                                ;WE GOT A CODE SO CHARGE THE SWITCH
528
529    036C 3A0420     CHARGE  LDA    PORT1
530    036F F640               ORI    CHG
531    0371 CDD104             CALL   OUT1            ;CLOSE THE CHARGE RELAY
532    0374 3E01               MVI    A,1
533    0376 CD1E05             CALL   DTMFON          ;START THE TONE
534    0379 CDBF05             CALL   D100MS
535    037C 16 0D              MVI    D,13
536    037E 01C2A2     WAIT0   LXI    B,41666
537    0381 DB01       WAIT1   IN     1
538    0383 E620               ANI    CHGEND
539    0385 CAAB02             JZ     READY           ;BACK TO READING VOLTS
540    0388 0B                 DCX    B
541    0389 78                 MOV    A,B
542    038A B1                 ORA    C
543    038B C28103             JNZ    WAIT1
544                            IF     CHGTIM
545    038E 15                 DCR    D
546    038F CAAB02             JZ     READY
547                            ENDIF  ;CHGTIM
548    0392 3A0320             LDA    PORT0
549    0395 EE40               XRI    XMT
550    0397 CDC904             CALL   OUT0
551    039A C37E03             JMP    WAIT0           ;LOOP TIL TIME OUT
552                            PAGE
553
554                                ;THE COMMANDS ARE PROCESSED IN THIS AREA
555    039D =          DISABA  EQU    $               ;DISABLE ALL SCANNING
556    039D 3EFF               MVI    A,0FFH
557    039F 320D20             STA    SCNSTAT
558    03A2 C3AF00             JMP    INIT
559
560    03A5 =          DISABS  EQU    $               ;DISABLE ALL EXCEPT RECLOSERS
561    03A5 3E0F               MVI    A,0FH
562    03A7 320D20             STA    SCNSTAT
563    03AA C3AF00             JMP    INIT
564
565    03AD =          RESETS  EQU    $               ;RESET LINE MEMORY TO CURRENT STATUS
566    03AD 3E00               MVI    A,0
567    03AF 320C20             STA    REFSTAT
568    03B2 C3A200             JMP    RESET
569
570    03B5 =          DTMFT   EQU    $
571    03B5 3E09               MVI    A,9
572    03B7 CD1E05             CALL   DTMFON          ;START THE TONE
573    03BA C3BA03     WFRESET JMP    WFRESET         ;LOOP TIL RESET
574
575                                ;THIS IS THE REPORT CHANGES ROUTINE. TERMINALS ARE SCANNED TO THE NEXT
576                                ;READING WHICH DOES NOT MATCH THE READING IN MEMORY OR UNTIL ALL ARE
577                                ;SCANNED.
578    03BD =          REPRTC  EQU    $               ;SELECT THE LINE WITH STATUS CHANGE
579    03BD 3A0920             LDA    LINSCN
580    03C0 FEFF               CPI    0FFH
581    03C2 C2E803             JNZ    REPRTC2         ;JUMP IF CHANGE DETECTED
582                                ;SINCE THERE IS NO CHANGE WAITING TO REPORT, SEARCH FOR ONE
583    03C5 3EFF       REPRTC1 MVI    A,SETFLAG
584    03C7 321020             STA    F%EPRTC         ;NO NEED TO CALL CONSOLE ON STATUS CHANGE
585    03CA 3A0A20             LDA    CHGSCN          ;GET THE LINE NUMBER
```

```
586    03CD CDB001           CALL    SCAN5
587    03D0 C601             ADI     01H
588    03D2 27               DAA
589    03D3 320A20           STA     CHGSCN
590    03D6 A7               ANA     A
591    03D7 C2C503           JNZ     REPRTC1        ;DO THE NEXT LINE IF NOT 00
592    03DA 3E0F             MVI     A,0FH
593    03DC CD1E05           CALL    DTMFON         ;SEND F TO SHOW NO CHANGE IN STATUS
594    03DF CDC205           CALL    D50MS
595    03E2 CD3005           CALL    DTMFOFF
596    03E5 C3A200           JMP     RESET
597    03E8 CD0505  REPRTC2  CALL    CTS            ;WAIT FOR DTMF OPENING
598    03EB CD5205           CALL    TWOTONE        ;SEND THE TWO LINE NUMBER TONES
599    03EE F5               PUSH    PSW
600    03EF 3EFF             MVI     A,0FFH
601    03F1 320920           STA     LINSCN
602    03F4 F1               POP     PSW
603    03F5 C3A202           JMP     LSGET2         ;CONTINUE AS IF CONSOLE SELECTED THE LINE
604                          PAGE
605
606                          ;THIS IS THE ROUTINE WHICH SENDS THE STATUS OF EACH TERMINAL TO THE CONSOLE
607                          ;AND PRINTER. ALL TERMONALS ARE SCANNED AND THE MEMORY IS UPDATED. THIS
608                          ;PROVIDES A LISTING OF THE CURRENT CONDITIONS FOR REFERENCE IF CHANGES ARE
609                          ;DETECTED.
610    03F8 =       REPRTA   EQU     $
611    03F8 CDB605           CALL    D500MS
612    03FB 3E00             MVI     A,0            ;THIS IS THE FIRST TERMINAL TO TEST
613    03FD 320220  REPRTA1  STA     LINE           ;THE BYTE IN LINE IS THE CURRENT TERMINAL
614    0400 3EFF             MVI     A,SETFLAG
615    0402 321120           STA     FREPRTA        ;THIS WILL ALLOW READY TO BE CALLED
616    0405 3E0E             MVI     A,0EH          ;THE STAR IS SENT FOR START OF SEQUENCE
617    0407 CD1E05           CALL    DTMFON
618    040A CDC205           CALL    D50MS
619    040D CD3005           CALL    DTMFOFF
620    0410 3A0220           LDA     LINE           ;GET THE TERMINAL NUMBER
621    0413 F5               PUSH    PSW
622    0414 CD5205           CALL    TWOTONE        ;SEND THE NUMBER TO CSL
623    0417 CDA202           CALL    LSGET2
624                          ;READY RETURNS WITH A STATUS TONE BEING TRANSMITTED.
625    041A CDC205           CALL    D50MS          ;LEAVE THE TONE ON FOR 50MS
626    041D CD3005           CALL    DTMFOFF
627    0420 F1               POP     PSW            ;TERMINAL NUMBER
628    0421 3C               INR     A
629    0422 27               DAA
630    0423 C2FD03           JNZ     REPRTA1        ;DO THE NEXT TERMINAL IF NOT 0
631    0426 3EFF             MVI     A,NOLINE
632    0428 CDD904           CALL    OUT2           ;DESELECT THE LAST LINE
633    042B 3E0F             MVI     A,0FH          ;F SENT TO RELEASE THE CONSOLE
634    042D CD1E05           CALL    DTMFON
635    0430 CDC205           CALL    D50MS
636    0433 CD3005           CALL    DTMFOFF
637    0436 C3A200           JMP     RESET          ;END OF REPORT
638                          PAGE
639
640
641
642
643
644
645
646
647
648
649
650                 ;       ************************************************************
651                 ;       *                                                          *
652                 ;       *                      SUBROUTINES                         *
653                 ;       *                                                          *
654                 ;       ************************************************************
655                          PAGE
656
657
658                          ;GET THE SWITCH STATUS AND RETURN WITH VALUE IN ACC.
659    0439 CD6C04  READSW   CALL    READ           ;READ THE VOLTMETER
660                          IF      NOT TRREV
```

```
661                            RET
662                            ENDIF
663  043C DA5204              JC      READSW2         ;GOT AN OPEN OR A SHORT
664  043F 47                  MOV     B,A             ;SAVE THE VALID READING IN B
665  0440 CD6004              CALL    FLIP
666  0443 CD6C04              CALL    READ            ;NOW LOOK FROM DIFFERENT POINT OF VIEW
667  0446 DA4C04              JC      READSW1         ;GOOD, NOW IT'S INVALID LIKE EXPECTED
668  0449 AF                  XRA     A               ;OOPS TWO VALID = SHORT
669  044A 37                  STC                     ;FLAG THE ERROR
670  044B C9                  RET                     ;RETURN SHOWING A SHORT
671  044C CD6004      READSW1 CALL    FLIP            ;TO THE VALID POSITION
672  044F 78                  MOV     A,B             ;GET THE READING FROM THE VALID POSITION
673  0450 A7                  ANA     A               ;NO FLAG FOR VALID READING
674  0451 C9                  RET
675  0452 A7          READSW2 ANA     A               ;CHECK FOR A SHORT
676  0453 37                  STC                     ;INCASE OF SHORT OR OPEN
677  0454 C8                  RZ                      ;REPORT IT AS A SHORT
678  0455 CD6004              CALL    FLIP
679  0458 CD6C04              CALL    READ
680  045B D0                  RNC                     ;RETURN WITH CORRECT READING AND POLARITY
681  045C 3E1F                MVI     A,01FH
682  045E 37                  STC                     ;FLAG OPEN
683  045F C9                  RET                     ;RETURN SHOWING OPEN
684
685                          ;TURN OVER TIP AND RING
686  0460 3A0420      FLIP    LDA     PORT1
687  0463 EE80                XRI     REV             ;FLIP TIP AND RING
688  0465 CDD104              CALL    OUT1
689  0468 CDC205              CALL    D50MS
690  046B C9                  RET
691
692                          ;READ THE VOLTMETER
693  046C DB01        READ    IN      1
694  046E 2F                  CMA
695  046F E61F                ANI     00011111B
696  0471 320620              STA     SCNDTA          ;SAVE IT FOR LATER
697  0474 FE1F                CPI     01FH
698  0476 CA8004              JZ      RERR            ;GOT AN INVALID CONDITION
699  0479 FE00                CPI     00H
700  047B CA8004              JZ      RERR            ;GOT AN INVALID CONDITION
701  047E A7                  ANA     A
702  047F C9                  RET                     ;'C' CLEAR
703  0480 37          RERR    STC
704  0481 C9                  RET                     ;'C' SET
705
706                          ;THE BEEP ROUTINE SENDS THE TONE THAT KEEPS THE CONSOLE FROM FLUTTERING
707  0482 F5          BEEP    PUSH    PSW
708  0483 3E0B                MVI     A,FLINHIB
709  0485 CD1E05              CALL    DTMFON          ;START FLUTTER INHIBIT TONE
710  0488 CDC205              CALL    D50MS           ;LENGTH OF TONE
711  048B CD3005              CALL    DTMFOFF         ;STOP THE TONE
712  048E F1                  POP     PSW
713  048F C9                  RET
714
715                          ;THIS ROUTINE IS CALLED WITH THE BCD LINE NUMBER IN THE ACC TO GIVE THE
716                          ;ADDRESS OF THE LINE STATUS BYTE.  THE ADDRES IS RETURNED IN H/L, THE ACC
717                          ;IS UNCHANGED
718  0490 =           LINLOC  EQU     $               ;GET ADDRESS OF LINE STATUS BYTE
719  0490 F5                  PUSH    PSW
720  0491 CDA004              CALL    BCDBIN          ;CONVERT TO BINARY
721  0494 C5                  PUSH    B
722  0495 010000              LXI     B,0
723  0498 4F                  MOV     C,A
724  0499 210021              LXI     H,LINMEM        ;POINT TO FIRST LOCATION
725  049C 09                  DAD     B
726  049D C1                  POP     B
727  049E F1                  POP     PSW
728  049F C9                  RET
729                           PAGE
730
731                          ;THIS ROUTINE CONVERTS A BCD BYTE TO 8 BIT BINARY.
732  04A0 C5          BCDBIN  PUSH    B
733  04A1 010000              LXI     B,0             ;CLEAR TALLY
734  04A4 F5                  PUSH    PSW
735  04A5 E6F0                ANI     0F0H            ;GET TOP 4 BITS
```

```
736  04A7 07070707           RLC!RLC!RLC!RLC
737  04AB CDB604             CALL    BCDBIN1
738  04AE F1                 POP     PSW
739  04AF E60F                ANI     0FH
740  04B1 CDB604             CALL    BCDBIN1
741  04B4 C1                 POP     B
742  04B5 C9                 RET
743  04B6 47     BCDBIN1     MOV     B,A
744  04B7 79                 MOV     A,C
745  04B8 0707               RLC!RLC
746  04BA 81                 ADD     C
747  04BB 07                 RLC
748  04BC 80                 ADD     B
749  04BD 4F                 MOV     C,A
750  04BE C9                 RET
751                          PAGE
752
753  04BF =      IN0         EQU     $          ;READ PORT 0
754  04BF DB00               IN      0
755  04C1 EE00               XRI     IVIBIT0
756  04C3 C9                 RET
757
758  04C4 =      IN1         EQU     $          ;READ PORT 1
759  04C4 DB01               IN      1
760  04C6 EE00               XRI     IVIBIT1
761  04C8 C9                 RET
762
763  04C9 =      OUT0        EQU     $          ;WRITE TO PORT0
764  04C9 320320             STA     PORT0      ;SAVE THE VALUE
765  04CC EEAF               XRI     IVOBIT0
766  04CE D300               OUT     0
767  04D0 C9                 RET
768
769  04D1 =      OUT1        EQU     $          ;WRITE TO PORT ONE FROM ACCUMULATOR
770  04D1 320420             STA     PORT1      ;SAVE FOR LATER
771  04D4 EE00               XRI     IVOBIT1
772  04D6 D301               OUT     1          ;WRITE TO THE PORT
773  04D8 C9                 RET
774
775  04D9 =      OUT2        EQU     $          ;WRITE TO PORT TWO FROM ACCUMULATOR
776  04D9 320520             STA     PORT2
777  04DC EEFF               XRI     IVOBIT2
778  04DE D302               OUT     2
779  04E0 C9                 RET
780                          PAGE
781
782                          ;ILDTMF IS CALLED TO SEND A SERIES OF TONES IMBEDDED IN THE PROGRAM.  THE
783                          ;SEQUENCE ENDS WITH 0FFH.
784  04E1 E3     ILDTMF      XTHL
785  04E2 7E     ILDTMF1     MOV     A,M        ;GET THE BYTE
786  04E3 23                 INX     H          ;POINT TO NEXT OR RETURN ADDRESS
787  04E4 FEFF               CPI     0FFH       ;SEE IF IT IS THE END
788  04E6 C2EB04             JNZ     ILDTMF2
789  04E9 E3                 XTHL
790  04EA C9                 RET
791  04EB CD0505 ILDTMF2     CALL    CTS
792  04EE CD1E05             CALL    DTMFON     ;START THE TONE
793  04F1 CDC205             CALL    D50MS
794  04F4 CD3005             CALL    DTMFOFF    ;STOP THE TONE AFTER 50MS
795  04F7 C3E204             JMP     ILDTMF1
796
797  04FA F5     ON130       PUSH    PSW        ;/GTE/
798  04FB 3A0320             LDA     PORT0
799  04FE F680               ORI     E130V      ;/GTE/
800  0500 CDC904             CALL    OUT0       ;/GTE/ ENABLE THE SUPPLY
801  0503 F1                 POP     PSW
802  0504 C9                 RET
803
804  0505 F5     CTS         PUSH    PSW
805  0506 CDBF04 CTS1        CALL    IN0        ;LOOK FOR INCOMMING TONES
806  0509 E610               ANI     DTMFV
807  050B C20605             JNZ     CTS1       ;LOOP TIL TONE ENDS
808  050E CDCB05             CALL    D10MS      ;WAIT 60MS
809  0511 CDC205             CALL    D50MS
810  0514 CDBF04             CALL    IN0        ;SEE IF LINE IS STILL QUIET
```

```
811  0517 E610              ANI    DTMFV
812  0519 C20605             JNZ    CTS1
813  051C F1                 POP    PSW       ;WAIT IF A NEW TONE HAS STARTED
814  051D C9                 RET
815
816  051E =          DTMFON  EQU    $         ;START TOUCH TONE (0-F IN ACC)
817  051E C5                 PUSH   B
818  051F CD7105              CALL   HEXDTMF   ;CONVERT TO DTMF
819  0522 47                 MOV    B,A       ;SAVE THE TONE VALUE
820  0523 3A0320              LDA    PORTO     ;SEE LAST OUT
821  0526 E6F0                ANI    0F0H      ;ZERO ALL DTMF BITS
822  0528 B0                 ORA    B         ;SAVE THE UPPER 3 BITS
823  0529 F650               ORI    DTMFV OR XMT
824  052B CDC904              CALL   OUT0      ;WRITE NEW BYTE
825  052E C1                 POP    B
826  052F C9                 RET              ;TONE IS ON
827
828  0530 3A0320   DTMFOFF   LDA    PORTO
829  0533 E6EF                ANI    NOT DTMFV ;DISABLE THE TONE
830  0535 CDC904              CALL   OUT0
831  0538 CDC205              CALL   D50MS
832  053B 3A0320              LDA    PORTO
833  053E E6BF                ANI    NOT XMT   ;MOVE TO REVEIVE DIRECTION
834  0540 CDC904              CALL   OUT0
835  0543 C9                 RET
836
837  0544 DB00     RDTMF     IN     0
838  0546 E610                ANI    DTMFV     ;CHECK DATA VALID BIT
839  0548 C24405              JNZ    RDTMF     ;LOOP TIL TONE OFF
840  054B DB00                IN     0
841  054D E60F                ANI    0FH       ;STRIP TOP 4 BITS
842  054F C37805              JMP    DTMFHEX   ;CHANGE IT TO HEX BEFORE RETURNING
843
844  0552 =        TWOTONE   EQU    $         ;SEND TWO DTMF FROM BYTE IN ACC
845  0552 F5                 PUSH   PSW
846  0553 F5                 PUSH   PSW
847  0554 E6F0                ANI    0F0H      ;SAVE UPPER FOUR BITS
848  0556 07070707            RLC!RLC!RLC!RLC
849  055A CD1E05              CALL   DTMFON
850  055D CDC205              CALL   D50MS
851  0560 CD3005              CALL   DTMFOFF   ;FIRST TONE SENT
852  0563 F1                 POP    PSW
853  0564 E60F                ANI    0FH       ;SAVE THE LOWER FOUR
854  0566 CD1E05              CALL   DTMFON
855  0569 CDC205              CALL   D50MS
856  056C CD3005              CALL   DTMFOFF
857  056F F1                 POP    PSW       ;ORIGINAL BYTE RESTORED
858  0570 C9                 RET
859                          PAGE
860
861  0571 E5       HEXDTMF   PUSH   H         ;CHANGE "A" FROM HEX TO DTMF
862  0572 219005              LXI    H,TTAB
863  0575 C37C05              JMP    CHANGE
864  0578 E5       DTMFHEX   PUSH   H         ;CHANGE "A" FROM DTMF TO HEX
865  0579 21A005              LXI    H,RTAB
866  057C E60F     CHANGE    ANI    0FH
867  057E 85                 ADD    L
868  057F 6F                 MOV    L,A       ;DTMF + TABLE LINE NUM
869  0580 7E                 MOV    A,M       ;ADDRESS IN TABLE IN H/L
870  0581 E1                 POP    H
871  0582 C9                 RET
872  0583            SKIP    DS     (16 - ($ MOD 16));SET TOP OF TABLE
873                 TTAB     IRPC   X,D01245689A37BFCE
874                          DB     0&X&H      ;TRANSMIT TABLE
875                          ENDM
876  0590+0D                 DB     0DH        ;TRANSMIT TABLE
877  0591+00                 DB     00H        ;TRANSMIT TABLE
878  0592+01                 DB     01H        ;TRANSMIT TABLE
879  0593+02                 DB     02H        ;TRANSMIT TABLE
880  0594+04                 DB     04H        ;TRANSMIT TABLE
881  0595+05                 DB     05H        ;TRANSMIT TABLE
882  0596+06                 DB     06H        ;TRANSMIT TABLE
883  0597+08                 DB     08H        ;TRANSMIT TABLE
884  0598+09                 DB     09H        ;TRANSMIT TABLE
885  0599+0A                 DB     0AH        ;TRANSMIT TABLE
```

```
886   059A+03              DB      03H         ;TRANSMIT TABLE
887   059B+07              DB      07H         ;TRANSMIT TABLE
888   059C+0B              DB      0BH         ;TRANSMIT TABLE
889   059D+0F              DB      0FH         ;TRANSMIT TABLE
890   059E+0C              DB      0CH         ;TRANSMIT TABLE
891   059F+0E              DB      0EH         ;TRANSMIT TABLE
892              RTAB      IRPC    X,D1234567890EFABC
893                        DB      0&X&H       ;RECEIVE TABLE
894                        ENDM
895   05A0+0D              DB      0DH         ;RECEIVE TABLE
896   05A1+01              DB      01H         ;RECEIVE TABLE
897   05A2+02              DB      02H         ;RECEIVE TABLE
898   05A3+03              DB      03H         ;RECEIVE TABLE
899   05A4+04              DB      04H         ;RECEIVE TABLE
900   05A5+05              DB      05H         ;RECEIVE TABLE
901   05A6+06              DB      06H         ;RECEIVE TABLE
902   05A7+07              DB      07H         ;RECEIVE TABLE
903   05A8+08              DB      08H         ;RECEIVE TABLE
904   05A9+09              DB      09H         ;RECEIVE TABLE
905   05AA+00              DB      00H         ;RECEIVE TABLE
906   05AB+0E              DB      0EH         ;RECEIVE TABLE
907   05AC+0F              DB      0FH         ;RECEIVE TABLE
908   05AD+0A              DB      0AH         ;RECEIVE TABLE
909   05AE+0B              DB      0BH         ;RECEIVE TABLE
910   05AF+0C              DB      0CH         ;RECEIVE TABLE
911
912              ;TRANSMITT TABLE
913   05B0 =     OUTTAB    EQU     $           ;TABLE OF CODES FOR VOLT READINGS
914   05B0 00              DB      0           ;LINE SHORT
915   05B1 02              DB      2           ;SW CLOSED FAULT
916   05B2 04              DB      4           ;SW CLOSED CLEAR
917   05B3 06              DB      6           ;SW OPEN FAULT
918   05B4 08              DB      8           ;SW OPEN CLEAR
919   05B5 05              DB      5           ;LINE OPEN
920                        PAGE
921
922              ;DELAYS
923
924   05B6 =     D500MS    EQU     $
925   05B6 CDBF05          CALL    D100MS
926   05B9 =     B400MS    EQU     $           ;400 MS
927   05B9 CDBC05          CALL    D200MS
928   05BC =     D200MS    EQU     $           ;200 MS
929   05BC CDBF05          CALL    D100MS
930   05BF =     D100MS    EQU     $           ;100 MS
931   05BF CDC205          CALL    D50MS
932   05C2 =     D50MS     EQU     $           ;50 MS
933   05C2 CDCB05          CALL    D10MS
934   05C5 =     D40MS     EQU     $           ;40 MS
935   05C5 CDC805          CALL    D20MS
936   05C8 =     D20MS     EQU     $           ;20 MS
937   05C8 CDCB05          CALL    D10MS
938   05CB =     D10MS     EQU     $           ; 10 MS
939   05CB C5              PUSH    B
940   05CC 060A            MVI     B,10
941   05CE CDD705 D10MS1   CALL    D1MS
942   05D1 05              DCR     B
943   05D2 C2CE05          JNZ     D10MS1
944   05D5 C1              POP     B
945   05D6 C9              RET
946
947   05D7 =     D1MS      EQU     $           ; 1 MS
948   05D7 F5              PUSH    PSW
949   05D8 3EDC            MVI     A,220
950   05DA 3D    D1MS1     DCR     A
951   05DB C2DA05          JNZ     D1MS1
952   05DE 00              NOP
953   05DF F1              POP     PSW
954   05E0 C9              RET
955   05E1                 END
```

CP/M MACRO ASSEM 2.0    #021    PDACS    CYEG-200 11-WC-CPU    GENERIC 0002    10/09/85

| Symbol | Addr | Refs | | | | | | | | |
|---|---|---|---|---|---|---|---|---|---|---|
| ALARMF | 200B | 99# | 100 | 223 | 229 | 360 | | | | |
| BCDBIN | 04A0 | 720 | 732# | | | | | | | |
| BCDBIN1 | 04B6 | 737 | 740 | 743# | | | | | | |
| BEEP | 0482 | 253 | 266 | 707# | | | | | | |
| CFR | 01A9 | 260 | 289# | 349 | | | | | | |
| CFR1 | 01B0 | 295# | 300 | | | | | | | |
| CFR2 | 01C0 | 298 | 306# | | | | | | | |
| CHANGE | 057C | 863 | 866# | | | | | | | |
| CHARGE | 036C | 508 | 521 | 529# | | | | | | |
| CHG | 0040 | 112# | 429 | 530 | | | | | | |
| CHGEND | 0020 | 111# | 538 | | | | | | | |
| CHGSCN | 200A | 98# | 99 | 268 | 585 | 589 | | | | |
| CHGTIM | FFFF | 65# | 544 | | | | | | | |
| CLRFLAG | 0000 | 85# | 274 | | | | | | | |
| CMDIN | 0255 | 386# | 388 | | | | | | | |
| CODE | 003D | 150# | 169 | 506 | 523 | | | | | |
| CODEPNT | 200E | 102# | 103 | 170 | 497 | 502 | 507 | 524 | | |
| CODERR | 0350 | 500 | 513# | | | | | | | |
| CODERR1 | 0363 | 516 | 523# | | | | | | | |
| CTS | 0505 | 597 | 791 | 804# | | | | | | |
| CTS1 | 0506 | 805# | 807 | 812 | | | | | | |
| D100MS | 05BF | 534 | 925 | 929 | 930# | | | | | |
| D10MS | 05CB | 808 | 933 | 937 | 938# | | | | | |
| D10MS1 | 05CE | 941# | 943 | | | | | | | |
| D1MS | 05D7 | 941 | 947# | | | | | | | |
| D1MS1 | 05DA | 950# | 951 | | | | | | | |
| D200MS | 05BC | 202 | 322 | 436 | 927 | 928# | | | | |
| D20MS | 05C8 | 935 | 936# | | | | | | | |
| D400MS | 05B9 | 369 | 926# | | | | | | | |
| D40MS | 05C5 | 934# | | | | | | | | |
| D500MS | 05B6 | 363 | 424 | 470 | 482 | 611 | 924# | | | |
| D50MS | 05C2 | 367 | 594 | 618 | 625 | 635 | 689 | 710 | 793 | 809 | 831 |
| | | 850 | 855 | 931 | 932# | | | | | |
| DISABA | 039D | 391 | 555# | | | | | | | |
| DISABS | 03A5 | 393 | 560# | | | | | | | |
| DTMFHEX | 0578 | 519 | 842 | 864# | | | | | | |
| DTMFOFF | 0530 | 364 | 368 | 435 | 483 | 595 | 619 | 626 | 636 | 711 | 794 |
| | | 828# | 851 | 856 | | | | | | |
| DTMFON | 051E | 362 | 366 | 457 | 463 | 478 | 533 | 572 | 593 | 617 | 634 |
| | | 709 | 792 | 816# | 849 | 854 | | | | |
| DTMFT | 03B5 | 397 | 570# | | | | | | | |
| DTMFV | 0010 | 110# | 176 | 375 | 387 | 411 | 489 | 806 | 811 | 823 | 829 |
| | | 838 | | | | | | | | |
| E130V | 0080 | 115# | 211 | 799 | | | | | | |
| FALSE | 0000 | 60# | 61 | 67 | 215 | 228 | | | | |
| FLASH | 0141 | 231# | 376 | | | | | | | |
| FLASH1 | 0147 | 235# | | | | | | | | |
| FLCNT | 0FA0 | 76# | 230 | 315 | | | | | | |
| FLINHIB | 000B | 81# | 365 | 708 | | | | | | |
| FLIP | 0460 | 665 | 671 | 678 | 686# | | | | | |
| FLSLEEP | 0000 | 67# | 249 | | | | | | | |
| FREPRTA | 2011 | 104# | 160 | 458 | 464 | 479 | 615 | | | |
| FREPRTC | 2010 | 103# | 104 | 269 | 275 | 334 | 584 | | | |
| HEXDTMF | 0571 | 818 | 861# | | | | | | | |
| IDLE0 | 0000 | 116# | 165 | | | | | | | |
| IDLE1 | 0028 | 117# | 167 | 451 | | | | | | |
| ILDTMF | 04E1 | 784# | | | | | | | | |
| ILDTMF1 | 04E2 | 785# | 795 | | | | | | | |
| ILDTMF2 | 04EB | 788 | 791# | | | | | | | |
| IN0 | 04BF | 518 | 753# | 805 | 810 | | | | | |
| IN1 | 04C4 | 758# | | | | | | | | |
| INIT | 00AF | 162# | 184 | 384 | 402 | 415 | 558 | 563 | | |
| INIT0 | 00EA | 189 | 191# | | | | | | | |
| INIT1 | 012D | 193 | 222# | | | | | | | |
| INIT2 | 0139 | 225 | 228# | | | | | | | |
| IVIBIT0 | 0000 | 68# | 755 | | | | | | | |
| IVIBIT1 | 0000 | 70# | 760 | | | | | | | |
| IVOBIT0 | 00AF | 69# | 765 | | | | | | | |
| IVOBIT1 | 0000 | 71# | 771 | | | | | | | |
| IVOBIT2 | 00FF | 72# | 777 | | | | | | | |
| KEY | 00FF | 78# | | | | | | | | |
| LED | 0020 | 109# | 236 | 433 | 468 | | | | | |

| | | | | | | | | | |
|---|---|---|---|---|---|---|---|---|---|
| LINE | 2002 | 90# | 91 | 422 | 437 | 514 | 613 | 620 | |
| LINEL | 2001 | 89# | 90 | | | | | | |
| LINEH | 2000 | 88# | 89 | 408 | | | | | |
| LINLOC | 0490 | 199 | 319 | 438 | 718# | | | | |
| LINMEM | 2100 | 105# | 724 | | | | | | |
| LINSCN | 2009 | 97# | 98 | 218 | 227 | 318 | 331 | 341 | 348 579 601 |
| LOCK | 02DB | 441 | 448# | | | | | | |
| LOCK1 | 02F8 | 455 | 462# | | | | | | |
| LOCK2 | 0302 | 461 | 467# | 471 | | | | | |
| LSGET | 0280 | 382 | 407# | | | | | | |
| LSGET1 | 0287 | 410# | 412 | | | | | | |
| LSGET2 | 02A2 | 422# | 603 | 623 | | | | | |
| MINSCAN | FFFF | 64# | 347 | | | | | | |
| NOLINE | 00FF | 79# | 163 | 217 | 226 | 313 | 325 | 449 | 631 |
| NXTSCN | 2007 | 95# | 96 | 158 | 183 | 241 | 243 | 246 | |
| ON130 | 04FA | 194 | 407 | 797# | | | | | |
| ONHOOK | 000B | 75# | 180 | | | | | | |
| OUT0 | 04C9 | 166 | 212 | 237 | 434 | 469 | 550 | 763# | 800 824 830 |
| | | 834 | | | | | | | |
| OUT1 | 04D1 | 168 | 430 | 452 | 531 | 688 | 769# | | |
| OUT2 | 04D9 | 164 | 201 | 219 | 314 | 321 | 326 | 423 | 450 632 775# |
| OUTTAB | 05B0 | 442 | 913# | | | | | | |
| PORT0 | 2003 | 91# | 92 | 210 | 235 | 431 | 467 | 548 | 764 798 820 |
| | | 828 | 832 | | | | | | |
| PORT1 | 2004 | 92# | 93 | 428 | 529 | 686 | 770 | | |
| PORT2 | 2005 | 93# | 94 | 776 | | | | | |
| RCTBL | 0093 | 154# | 273 | 294 | | | | | |
| RDTMF | 0544 | 179 | 379 | 389 | 413 | 496 | 837# | 839 | |
| READ | 046C | 659 | 666 | 679 | 693# | | | | |
| READSW | 0439 | 203 | 323 | 439 | 659# | | | | |
| READSW1 | 044C | 667 | 671# | | | | | | |
| READSW2 | 0452 | 663 | 675# | | | | | | |
| READV | 02AB | 428# | 539 | 546 | | | | | |
| READV0 | 02C3 | 437# | 495 | | | | | | |
| READV1 | 02D0 | 442# | | | | | | | |
| READV2 | 02D3 | 443# | 446 | | | | | | |
| REFSET | 00FC | 198# | 209 | | | | | | |
| REFSTAT | 200C | 100# | 101 | 191 | 214 | 567 | | | |
| RELOAD | 031F | 487# | 505 | | | | | | |
| REPRTA | 03F8 | 401 | 610# | | | | | | |
| REPRTA1 | 03FD | 613# | 630 | | | | | | |
| REPRTC | 03BD | 339 | 399 | 578# | | | | | |
| REPRTC1 | 03C5 | 583# | 591 | | | | | | |
| REPRTC2 | 03E8 | 581 | 597# | | | | | | |
| RERR | 0480 | 698 | 700 | 703# | | | | | |
| RESET | 00A2 | 121 | 156# | 568 | 596 | 637 | | | |
| RESET1 | 00CA | 175# | 188 | | | | | | |
| RESET2 | 00E1 | 177 | 185# | | | | | | |
| RESETS | 03AD | 395 | 565# | | | | | | |
| REV | 0080 | 114# | 687 | | | | | | |
| RTAB | 05A0 | 865 | 892# | | | | | | |
| SCAN | 016C | 252 | 256# | | | | | | |
| SCAN1 | 016F | 257# | 261 | | | | | | |
| SCAN2 | 017B | 262# | | | | | | | |
| SCAN3 | 0192 | 265 | 273# | | | | | | |
| SCAN4 | 0195 | 274# | 283 | | | | | | |
| SCAN5 | 01D0 | 271 | 281 | 317# | 586 | | | | |
| SCAN6 | 0201 | 330 | 333 | 340# | 355 | | | | |
| SCAN7 | 0208 | 336 | 346# | | | | | | |
| SCAN8 | 021E | 350 | 353 | 357# | | | | | |
| SCAN9 | 0220 | 359# | 370 | | | | | | |
| SCANCK | 014F | 241# | | | | | | | |
| SCNCNT | 0008 | 77# | 182 | 245 | | | | | |
| SCNDTA | 2006 | 94# | 95 | 351 | 696 | | | | |
| SCNEND | 01C5 | 244 | 250 | 254 | 279 | 313# | | | |
| SCNLIN | 2008 | 96# | 97 | 196 | 256 | 259 | | | |
| SCNSTAT | 200D | 101# | 102 | 161 | 247 | 263 | 557 | 562 | |
| SETFLAG | 00FF | 83# | 583 | 614 | | | | | |
| SKIP | 0583 | 872# | | | | | | | |
| STACK | 23FF | 106# | 162 | | | | | | |
| STATCHG | 0000 | 82# | 361 | | | | | | |
| STATOK | 005A | 80# | 192 | 213 | | | | | |
| TEST4E | 0332 | 490 | 496# | | | | | | |
| TONEIN | 024B | 181 | 380# | | | | | | |
| TRREV | FFFF | 66# | 660 | | | | | | |

| | | | | | | |
|---|---|---|---|---|---|---|
| TRUE | FFFF | 61# | 64 | 65 | 66 | 359 |
| TSTAT | 0241 | 234 | 316 | 374# | | |
| TTAB | 0590 | 862 | 873# | | | |
| TTTO | 1F40 | 84# | 174 | | | |
| TWOTONE | 0552 | 598 | 622 | 844# | | |
| WAIT0 | 037E | 536# | 551 | | | |
| WAIT1 | 0381 | 537# | 543 | | | |
| WAIT500 | 0322 | 488# | 494 | 525 | | |
| WFRESET | 03BA | 573# | 573 | | | |
| XHIT | 0310 | 444 | 476# | | | |
| XMT | 0040 | 113# | 432 | 468 | 549 | 823 | 833 |

Having thus described one preferred embodiment of the present invention, it will be appreciated by those skilled in the art that the objects of this invention have been achieved in realizing a remote monitoring and control system for e.g. power switching and distribution apparatus. To those skilled in the art to which this invention pertains, many changes in construction and widely varying embodiments will be readily apparent without departing from the spirit or scope of this invention. The disclosures and the description herein are purely illustrative and are not intended to be in any sense limiting.

I claim:

1. In a remote monitoring and control system of the type including an operations console at a central control point, a wire center unit located remote from the operations console at a location at which wire pairs for a geographic area are concentrated, and a plurality of monitored switching units in the area to be remotely monitored and controlled from the central control point, and wherein each switching unit includes a switchable connection arrangement and is connected to the wire center by a control wire pair comprising a tip and ring wire in predetermined connection order, the connection being provided so that the wire center may monitor and control the switching unit, and wherein a communications path extends between the wire center and the central control point, an improved wire center unit comprising a plurality of interconnected modules including:

at least one line select module for selecting a switching unit wire pair from among a plurality of pairs extending from switching units and connected to the line select module, a line switch decoder module for sensing connection arrangement conditions present at a selected switching unit and for converting sensed conditions into a binary code, and independently for providing a control signal to the selected switching unit via the line select module to change the connection arrangement thereof, a communications module connected to the communications path for decoding commands received from the operations console and for encoding responses from the wire center unit sent to the operations console, and programmable digital microcomputer means for controlling all operations of the wire center unit with reference to a said switching unit in accordance with a series of instructions stored in a read only program memory associated with the digital microcomputer means and in accordance with commands received via the communications module concerning the said switching unit and connection arrangement conditions monitored at the said switching unit via the line switch decoder module and for providing responses to the operations console via the communications module.

2. The improved wire center unit as set forth in claim 1 wherein said digital microcomputer means is programmed to cause the the wire center unit automatically to scan periodically all switching units attached thereto via the at least one line select module in order to determine present connection arrangement conditions thereof and to record said conditions, and for automatically signalling the operations console of any detected change in connection arrangement condition of any switching unit when a presently monitored condition at said unit is determined by the digital microcomputer means to be different than a condition for that unit recorded in a prior periodic scan.

3. The improved wire center unit as set forth in claim 1 wherein said digital microcomputer is programmed automatically to test the tip and ring order of connection of each wire pair extending to each switching unit from the wire center unit before passing on any operational commands received from the operations console, and wherein the wire center unit includes sense reversal means for sensing and reversing the order of connection of a wire pair in the event that reversal of tip and ring wire order of connection of a wire pair is detected.

4. The improved wire center unit as set forth in claim 3 wherein said sense reversal means for sensing and reversing the tip and ring wire order of connection of a wire pair is provided by automatically detecting a response from the switching unit which is characteristic of reversal of connection of the tip and ring wires and thereupon automatically reversing the order of connection.

5. The improved wire center unit as set forth in claim 1 wherein said line switch decoder module includes switch operation detection means responsive to a predetermined switching transient overvoltage condition present on a selected wire pair when remote switching has occurred for generating a binary value readable by said microcomputer means in response to detection of said switching transient overvoltage condition on the selected wire pair.

6. The improved wire center unit as set forth in claim 5 wherein said switch operation detection means includes latching means for latching said binary value, said latching means being reset upon the next following remote switch operation command received by the wire center unit from the operations console via the communications module.

7. In a remote monitoring and control system of the type including a wire center unit at a location at which wire pairs for a geographic area are concentrated, and a plurality of switching units in the area to be remotely monitored and controlled from a central control point through the wire unit and wherein each switching unit is connected to the wire center by a wire pair and includes a connection arrangement status circuit which places a status signal on the wire pair indicative of connection arrangement condition of the switching unit in response to current flow in a forward direction supplied by the wire unit and further includes a control circuit which responds to current flow from the wire unit supplied in an opposite direction by operating a switch, an improved switching unit comprising threshold circuit means in series with the control circuit, the threshold circuit for passing current flow in said opposite direction only when the potential difference across the threshold circuit means resulting from current flow in said opposite direction exceeds a predetermined voltage which is substantially in excess of the potential difference which develops across the threshold circuit means from current flow in the forward direction.

8. The improved wire center unit as set forth in claim 1 wherein each of said plurality of monitored switching units comprises means for operating a power distribution switch within a primary power distribution network.

* * * * *